United States Patent [19]

Comer

[11] Patent Number: 5,322,418
[45] Date of Patent: Jun. 21, 1994

[54] HIGH PRESSURE LIQUID PUMP APPARATUS AND PUMPING METHOD

[75] Inventor: Robert C. Comer, Hopkins, Minn.

[73] Assignee: The Toro Company, Minneapolis, Minn.

[21] Appl. No.: 978,851

[22] Filed: Nov. 19, 1992

[51] Int. Cl.$^5$ .............................................. F04B 19/00
[52] U.S. Cl. .................................... 417/53; 417/364; 417/49 D; 222/389; 239/99; 111/127
[58] Field of Search ................. 417/53, 364, 490, 466, 417/465, 486; 222/389, 340; 239/99, 101; 111/127

[56] References Cited

U.S. PATENT DOCUMENTS

| 2,930,334 | 3/1960 | Marron et al. | 111/127 |
| 3,292,867 | 12/1966 | Hunter | 222/389 |
| 3,403,818 | 10/1968 | Enssle | 222/389 |
| 3,521,820 | 7/1970 | Cooley | 239/101 |
| 3,626,446 | 12/1971 | Voitsekhovsky et al. | 239/99 |
| 3,815,525 | 6/1974 | Kainson et al. | 239/101 |
| 4,074,858 | 2/1978 | Burns et al. | 111/127 |
| 5,101,745 | 4/1992 | Podevels et al. | 111/127 |

Primary Examiner—Henry A. Bennet
Assistant Examiner—Roland E. McAndrews, Jr.
Attorney, Agent, or Firm—James W. Miller

[57] ABSTRACT

A liquid pumping apparatus and pump method is provided in which a reciprocal drive piston is carried in a pump body and is reciprocated back and forth by a mechanical power source such as a crankshaft. The pump body has a pump chamber which receives the liquid to be pumped. A pump piston which is separate from the drive piston is operatively connected to the pump chamber to expand and contract the volume of the pump chamber to first fill the pump chamber with liquid and then expel the liquid from the pump chamber in a pumping action. The pump piston is coupled to the drive piston for movement therewith during a portion of a pump cycle such that the drive piston is effective to move the pump piston in its volume expanding direction relative to the pump chamber at a first speed. Then, the connection between the pump piston and drive piston is broken and the pump piston is accelerated in its volume contracting direction to a second substantially faster speed to pump the liquid out of the pump chamber.

37 Claims, 12 Drawing Sheets

//5,322,418//

HIGH PRESSURE LIQUID PUMP APPARATUS AND PUMPING METHOD

Technical Field

The present invention relates to an apparatus for creating high pressure jets of a relatively incompressible fluid which comprises a liquid such as water. More particularly, the present invention relates to an apparatus for pumping such liquid at sufficient pressure such that the liquid will form a high pressure jet when applied to a nozzle, and to a novel pumping method embodied in such apparatus.

BACKGROUND OF THE INVENTION

The Toro Company of Minneapolis, Minnesota is the owner of U.S. Pat. Nos. 5,101,745 and 5,119,744. These patents disclose using high pressure water jets for soil cultivation. Namely, high pressure water jets are formed and injected directly into the ground from a movable implement that traverses over the ground. The high pressure jets form small holes or openings in the turf extending down to or below the root zone of the turf. These openings relieve soil compaction and allow water and other nutrients to reach and nourish the root zone of the turf, thereby generally promoting turf growth. The jets also fracture the soil to reduce overall soil density.

In the soil cultivation implement shown in these patents, a manifold is provided having a plurality of downwardly directed nozzles which point toward the ground. High pressure water applied to the manifold is formed into individual jets by the nozzles with the jets then being injected into the ground. The device includes a water supply means for periodically supplying high pressure water to the manifold to periodically create the water jets. The jets form an array of spaced holes in the turf as the implement travels over the ground.

While the water supply means shown in these prior Toro patents is effective for its intended purpose, it is relatively complex. It includes a mechanically driven pump having one or more reciprocating pump plungers which are driven back and forth in chambers to pump water at relatively high pressures, e.g. up to 5,000 psi. The high pressure water exiting the pump is received in an accumulator for use at those times when water injection is required. While the accumulator can be precharged by gas to about half the desired pressure, the incoming water from the pump raises the pressure of the accumulated liquid in the accumulator to the high pressures that are required. Finally, a valve periodically opens the outlet of the accumulator to supply a burst of high pressure water to the manifold. This valve is mechanically driven in a timed relationship to the implement's speed to allow proper spacing between the holes placed in the turf.

Three major components are required in the prior art water supply means just described, i.e. a high pressure, mechanically driven pump, a high pressure liquid accumulator, and a high pressure valve for periodically opening the outlet of the accumulator. All of these components have to withstand the high water pressures involved. The need for a plurality of separate components adds to the expense, complexity and weight of the soil cultivation apparatus.

SUMMARY OF THE INVENTION

It would be desirable to have a pump apparatus for pumping high pressure liquid, which liquid is pumped at sufficient pressure to form high pressure jets when applied to a nozzle, that would be less complex, and thus less expensive than known systems, but would still be reliable and durable. In addition, it would be desirable to provide a pump apparatus in which the pressure pattern of the pumped liquid (i.e. the pressure increase versus time) allows the liquid jet to be more effectively injected into a substance such as soil or turf.

These and other aspects of the present invention are provided by a liquid pump apparatus for pumping a liquid at an increased pressure. The apparatus is driven by a motive means that provides a source of power for the liquid pumping action. The apparatus comprises a pump body having a pump chamber which is suited to be filled with the liquid that is to be pumped, the pump chamber having inlet means for admitting the liquid to the pump chamber and outlet means for allowing the liquid to exit from the pump chamber. A pump means is operatively connected to the pump chamber and is movable relative to the pump chamber for expanding and contracting the volume of the pump chamber as the pump means moves relative to the pump chamber. A valve means is associated with the inlet means and the outlet means of the pump body for allowing the liquid to flow into the pump chamber through the inlet means when the pump means is moved in a direction in which the pump chamber volume is expanded and for allowing the liquid to be pumped out of the pump chamber through the outlet means when the pump means is moved in a direction in which the pump chamber volume is contracted. A drive means is operatively connected to the motive means, wherein the drive means is separate from the pump means such that the pump means can move independently from the drive means over at least a portion of the movement of the pump means. A means is provided for operatively transmitting the movement of the drive means to the pump means during a portion of each pump cycle such that the transmitted motion moves the pump means at a first speed when the pump chamber volume is expanded to fill the pump chamber with liquid. Finally, a means is present for uncoupling the motion transmitting means between the pump means and the drive means after the pump chamber volume has been expanded and filled with liquid and for then accelerating the pump means to a second speed which is faster than the first speed in a direction in which the pump chamber volume is contracted to pump the liquid out of the pump chamber at the increased pressure.

BRIEF DESCRIPTION OF THE DRAWINGS

The present invention will be described more completely hereafter in the Detailed Description, when taken in conjunction with the following drawings, in which like reference numerals refer to like elements throughout.

FIG. 1 is a front elevational view of a soil cultivation apparatus of the type shown in U.S. Pat. Nos. 5,101,745 and 5,119,744, the frame of the soil cultivation apparatus being illustrated in phantom, and particularly illustrating the liquid jet manifold and nozzles of the soil cultivation apparatus as well as one embodiment of an improved high pressure water pump apparatus of this invention;

DETAILED DESCRIPTION

Figure 2:
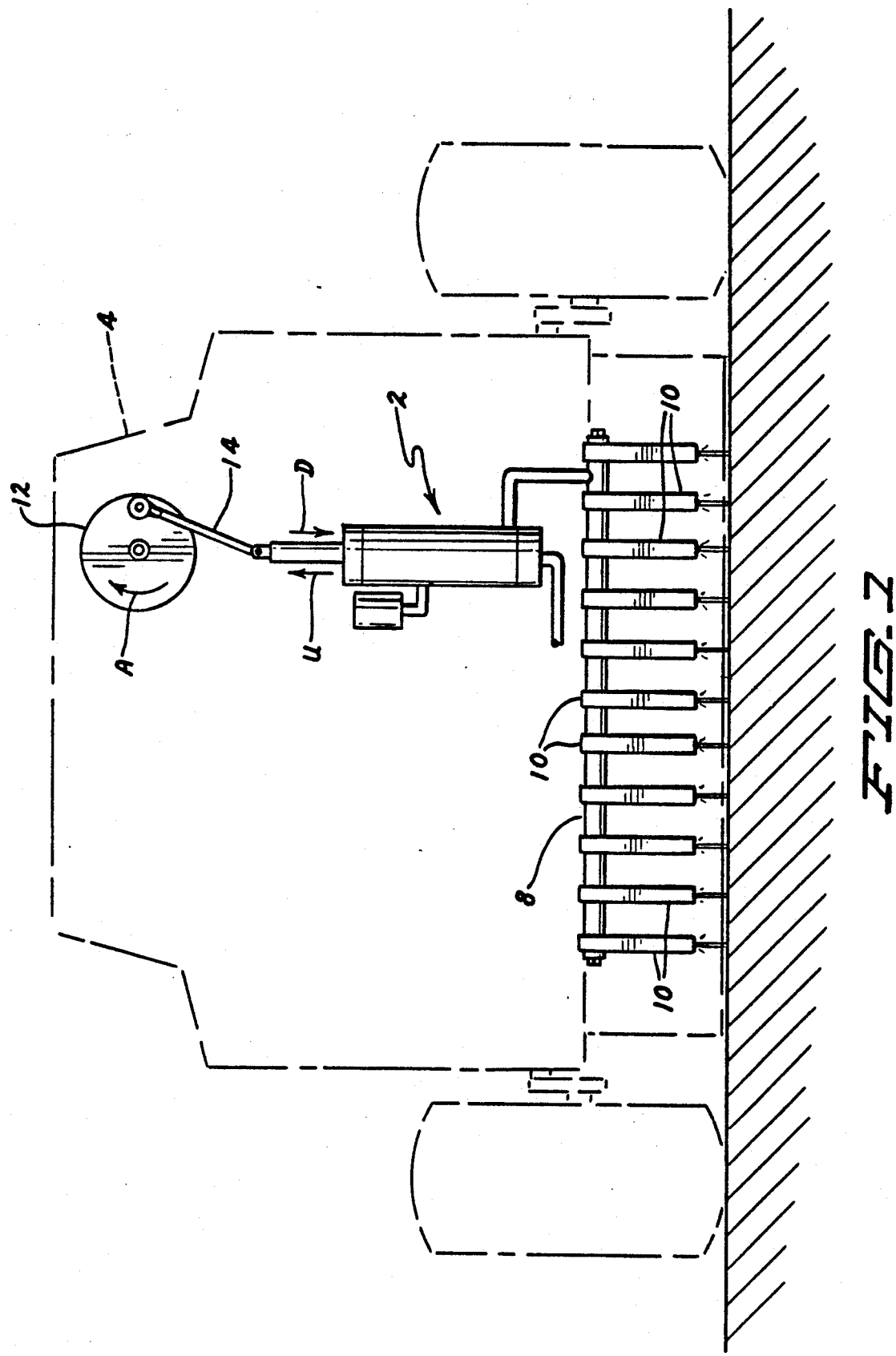
FIG. 2 is a cross-sectional view of a first embodiment of a high pressure water pump apparatus according to the present invention, particularly illustrating the components thereof in a first position at the beginning of a pump cycle prior to the upstroke of the drive piston with the pump chamber having its minimum volume.
Figure 2:
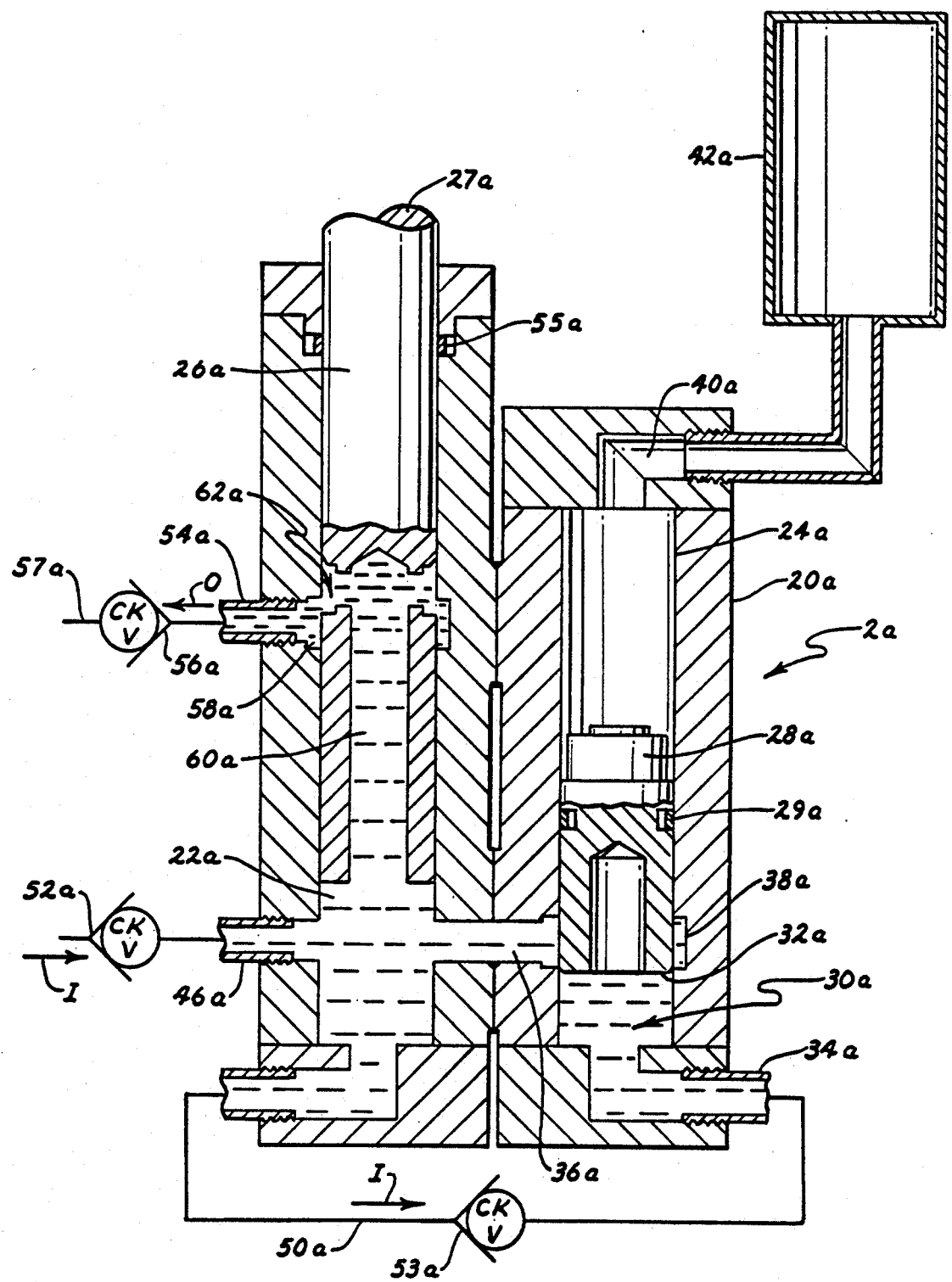

Referring first to FIG. 1, the present invention relates to a high pressure water pump apparatus one embodiment of which is illustrated generally as 2 in FIG. 1. Apparatus 2 is shown as part of an implement 4 used for soil cultivation as described in U.S. Pat. Nos. 5,101,745 and 5,119,744, which are assigned to the Toro Company, Minneapolis, Min., the assignee of the present invention. These patents are hereby incorporated by reference with respect to the details of the soil cultivation implement 4 and the method of soil cultivation utilizing high pressure water jets. Implement 4 and the soil cultivation method which is the subject of these prior patents will be described herein only as is necessary for an understanding of the novel and unique high pressure water pump apparatus 2 of the present application.

While pump apparatus 2 will be described herein as a "water pump apparatus" for pumping water, apparatus 2 is suited for pumping any relatively incompressible fluid and particularly a liquid. This would include water mixed with various additives, such as fertilizers, or other non-water based liquids. Accordingly, pump apparatus 2 is not limited for use only with water.

Basically, soil cultivation implement 4 is movable to allow implement 4 to travel over the turf area which is to be cultivated. Implement 4 includes a liquid jet manifold 8 having a plurality of downwardly extending nozzles 10 directed toward the ground. When high pressure water is supplied to manifold 8, a high pressure water jet exits through each of nozzles 10 to be injected into the ground for turf cultivation purposes. Nozzles 10 will form a row of openings in the ground equal to the number of nozzles. The high pressure water is periodically, and not continuously, applied to manifold 8 so that adjacent rows of openings will be spaced apart by a small distance as implement 4 moves over the ground. When implement 4 is done treating the ground, the ground will be covered with an array of spaced holes which effectively promote turf growth. Again, the details of the method of soil cultivation utilizing high pressure liquid jets are more completely set forth in the Toro patents incorporated by reference herein.

The present invention relates to a high pressure water pump apparatus 2 for supplying nozzle jet manifold 8 with the high pressure water that is required to form the liquid jets. While water pump apparatus 2 of this invention is shown in connection with the soil cultivation method of the prior Toro patents, it is not limited for use with that method alone. Indeed, water pump apparatus 2 of this invention could be used in any application in which high pressure water is desirably supplied in a periodic fashion for use in a particular application. Accordingly, the high pressure water pump apparatus of this invention is not restricted to a method for soil cultivation, though it is well suited for use in such a soil cultivation operation.

The present invention discloses a number of separate embodiments of a high pressure water pump apparatus according to the present invention. While the different embodiments of the present invention are obviously not identical, they do share some common components and characteristics. Accordingly, the same reference numeral will be used when possible to refer to identical or corresponding components in the different embodiments, with the exception that letter designations a, b, c, etc. will be used as suffixes for numerals referring to components in the first, second, third embodiments, etc., respectively. For example, a particular component in the first embodiment will be referred to by a numeral with an "a" suffix, e.g. apparatus $2a$, the same or corresponding component in the second embodiment will use the same reference numeral with a "b" suffix, e.g. apparatus $2b$, and so on. If a numeral which normally carries a letter suffix is used without such a suffix, e.g. apparatus 2, that description is intended to apply to all the embodiments of the invention equally.

All of the embodiments of water pump apparatus 2 are driven by a mechanical power source contained on implement 4. In the first three embodiments shown in FIGS. 2–10, that power source comprises a crankshaft 12 which is adapted to be rotated, either directly or indirectly, by some engine or motor (not shown) that provides power for implement 4. Crankshaft 12 includes a connecting rod or crankarm 14 which is mechanically coupled to a drive piston 26 that is part of water pump apparatus 2. As crankshaft 12 rotates unidirectionally in the direction of arrow A in FIG. 1, crankarm 14 will continuously reciprocate drive piston 26 in an upstroke and a downstroke represented by the arrows U and D in FIG. 1. The operation and structure of drive piston 26 will be described more completely in connection with the description of each separate embodiment of water pump apparatus 2.

The Embodiment of FIGS. 2–5

Referring first to FIG. 2, a first embodiment of the water pump apparatus of the present invention is illustrated as $2a$. Apparatus $2a$ comprises a pump body $20a$ that includes two major cylindrical bores or passageways, i.e. a drive bore $22a$ and a pump bore $24a$. Bores $22a$ and $24a$ are preferably parallel to one another, but could be oriented in other spatial relationships relative to one another. Drive piston $26a$ comprises a cylindrical body that is reciprocally contained in drive bore $22a$ for a reciprocating motion back and forth relative to drive bore $22a$. Drive piston $26a$ extends outwardly of bore $22a$ to terminate in an upper end $27a$ outside of pump body $20a$ for connection to crankarm 14. A cylindrical pump piston $28a$ is reciprocally contained in the other cylindrical pump bore $24a$.

As will be explained in more detail hereafter, pump piston $28a$ is separate from drive piston $26a$, can move independently of drive piston $26a$, and is the member which acts to pump the liquid out of pump body $20a$. The components of apparatus $2a$ as illustrated in FIG. 2 are shown at the beginning of a pump cycle. For the purpose of this application, a pump cycle will comprise one complete revolution of crankshaft 12 with a corresponding single up and down cycle of movement of drive piston $26a$.

Figure 4:
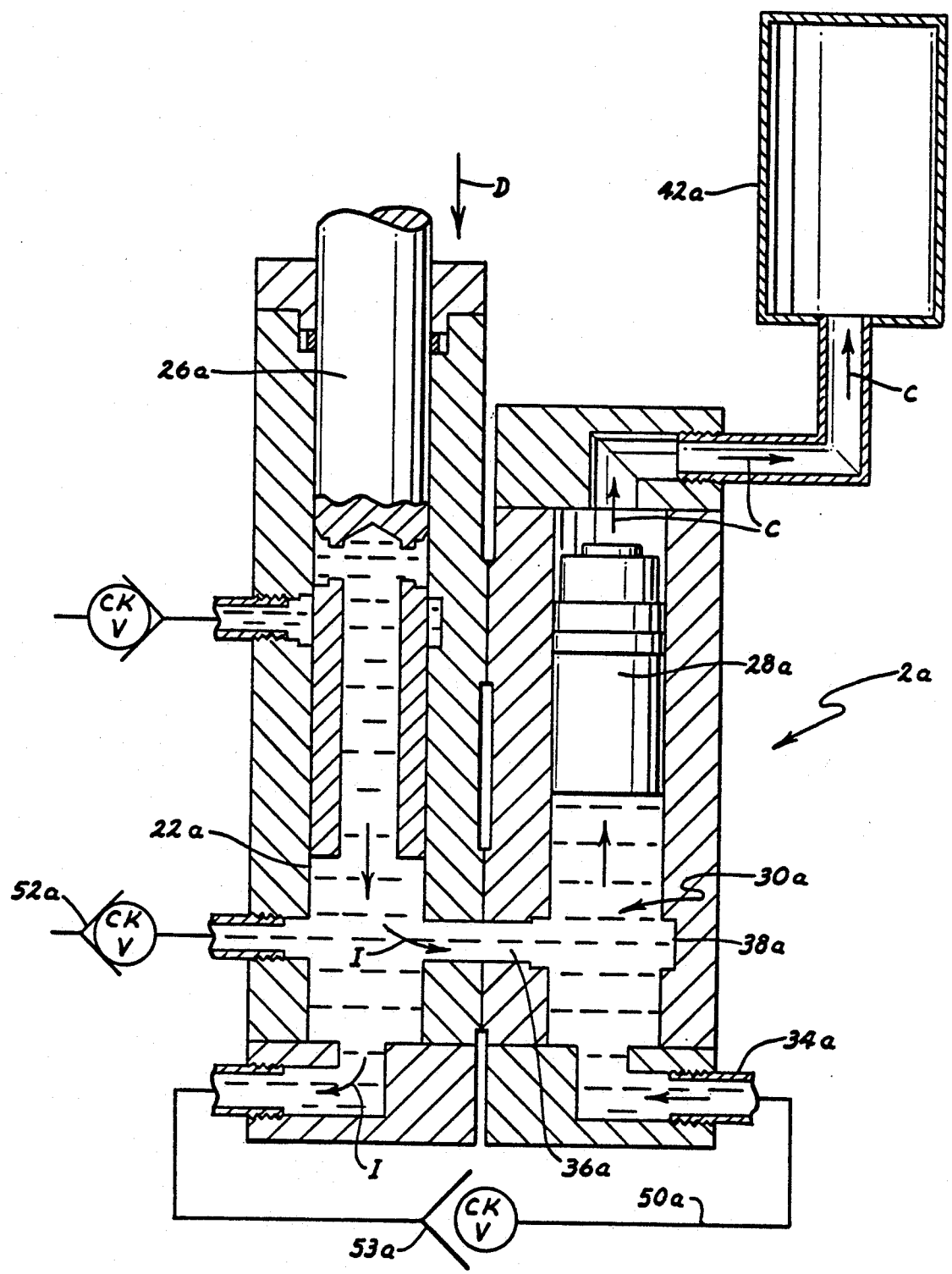
FIG. 4 is a cross-sectional view of the high pressure water pump apparatus shown in FIG. 2, but illustrating the components thereof in a third position in which the drive piston has begun its downstroke which causes the pump piston to be raised to allow the volume of the pump chamber to be expanded and filled with water and to allow the gas in the gas reservoir to be compressed.

A pump chamber $30a$ is formed between the lower end of pump bore $24a$ and a lower face $32a$ of pump piston 28. Chamber $30a$ is called the pump chamber because it is the chamber which is filled and emptied of liquid during the pumping action. The filling of pump chamber $30a$ occurs during an upward movement of pump piston $28a$ as shown in FIG. 4, so that pump chamber $30a$, in effect, has a variable liquid receiving volume. The periphery of pump piston $28a$ includes a suitable sealing means $29a$, such as a resilient chevron or O-ring seal, shown in FIG. 2, for preventing leakage of liquid along the sides of pump piston $28a$ to confine the liquid within pump chamber $30a$. One suitable sealing means is the Quad P.E. Plus seal manufactured by Minnesota Rubber.

A liquid inlet $34a$ is provided for allowing the liquid to flow into and fill pump chamber $30a$. The liquid is allowed to leave pump chamber $30a$ through a liquid outlet passage $36a$ located in pump body $20a$. An annular outlet port $38a$ connects outlet passage $36a$ to pump chamber $30a$. This annular outlet port $38a$ is desirably located above the lower end of pump chamber $30a$ for a reason which will be described later.

The top portion of pump bore $24a$ is connected through a suitable passage $40a$ to an enclosed chamber or reservoir $42a$ that stores a pressurized gas. The gas within reservoir $42a$ can be precharged or prepressurized to some degree, e.g. to a level of about one-half the ultimate pressure at which the liquid is desirably pumped (a precharge of 2,500 psi or so as pump apparatus $2a$ is designed to deliver the liquid at approximately 5,000 psi). However, the upward movement of pump piston $28a$ within pump bore $24a$ will further compress and pressurize the gas within gas reservoir $42a$. Thus, gas reservoir $42a$ forms an energy storing device the energy of which is directed against the upper face $44a$ of pump piston $28a$. This energy can be used to accelerate pump piston $28a$ downwardly in a pumping action as will be described in more detail hereafter.

While a gas reservoir $42a$ is one particular type of energy storing means that is well suited for use in the present invention, any other suitable energy storing means could be used as long as such means can store energy when pump chamber $30a$ is being filled with liquid and can use this stored energy to thereafter accelerate pump piston $28a$ to empty pump chamber $30a$ of liquid. For example, a compressible spring 140 (or a set of compressible springs 140) that is alternately compressed and then allowed to expand could be substituted for gas reservoir $42a$. Such a spring is illustrated and described in reference to the pump embodiment shown in FIG. 12, but this spring device can be used with any of the pump embodiments shown in this patent application in place of the gas reservoir.

The inlet and outlet paths for the liquid entering pump chamber $30a$ pass through drive bore $22a$ in which drive piston $26a$ is contained. For example, the main liquid inlet $46a$ to pump body $20a$, which inlet $46a$ is connected to a source of unpressurized liquid such as a tank of water (not shown), is provided in the lower portion of drive bore $22a$. The lower portion of drive bore $22a$ is in liquid communication with the outlet passage $36a$ of pump chamber $30a$. In addition, the lower portion of drive bore $22a$ is further connected to inlet $34a$ of pump chamber $30a$ through a separate, intermediate liquid supply line $50a$. Both of the liquid inlets, i.e. both the main inlet $46a$ to drive bore $22a$ as well as inlet $34a$ to pump chamber $30a$, are protected by check valves 52a and 53a, respectively, to prevent an undesirable backflow of liquid. However, check valves 52a and 53a will open when subjected to water of a certain pressure such that water flows through the check valves in the direction of the arrows I in FIG. 2, as will be described hereafter.

Drive bore 22a extends upwardly and includes a main liquid outlet 54a for the liquid that is being pumped out of pump chamber 30a. Main outlet 54a is shown approximately midway along the length of drive bore 22a above main inlet 46a. A check valve 56a is inserted into the outlet line which check valve can open when liquid is being pumped out of pump body 20a under sufficient pressure as illustrated by the arrow O in FIG. 2. The outlet line 57a leading from check valve 56a is connected in any suitable manner to manifold 8 carrying nozzles 10. Accordingly, when high pressure water is being pumped out of pump body 20a and past check valve 56a, that water will be supplied to nozzle manifold 8, and hence to nozzles 10, to create high pressure, injectable jets of water. Again, pump 2 can be used for applications other than injection of water jets into soil or turf.

A suitable sealing means 55a, similar to sealing means 29a, is used to seal the outer diameter of drive piston 26a to prevent liquid from leaking out of drive bore 22a along the sides of drive piston 26a.

An annular outlet port 58a is also provided in drive bore 22a in liquid communication with the drive bore 22a and with main outlet 54a. Drive piston 26a includes a longitudinal flow passage 60a over its lower end. This passage 60a terminates in an annular spool valve 62a located on the outer diameter of drive piston 26a. Spool valve 62a on drive piston 26a comprises an annular ring on the outer diameter of drive piston 26a which ring will at times register or communicate with the annular outlet port 58a formed in drive bore 22a. This affords a valving action which will control the operation of apparatus 2a as will be described hereafter.

The operation of pump apparatus 2a over a single pump cycle will now be described by sequentially referring to FIGS. 2-5 to illustrate the various steps in a single pump cycle. However, the pump cycle being described represents just one revolution of crankshaft 12. Many revolutions of crankshaft 12 will occur over time so that many pump cycles will sequentially follow one another in short order. Each pump cycle will cause a high pressure water burst to be supplied by water pump apparatus 2a to nozzle jet manifold 8. Each such burst will be formed into a plurality of liquid jets that can be injected into the ground when apparatus 2a is used for the soil cultivation purposes shown in the prior Toro patents. Accordingly, the timing between such injections can be regulated simply by changing the rotational speed of crankshaft 12. There is no need for any separate fluid supply valve to be operated in a timed relationship to crankshaft 12.

Referring to FIG. 2, the components are illustrated in their positions at the beginning of a pump cycle, when drive piston 26a is at its lowermost point before it begins to move upwardly under the influence of crankarm 14. In this configuration, pump piston 28a will be resting on a small cushion of water contained in pump chamber 30a beneath the level of the annular output port 38a. Pump piston 28a will effectively be blocking outlet port 38a so that outlet passage 36a is cut off. However, as shown in FIG. 2, some liquid will be present in pump chamber 30a and in the lower portions of drive bore 22a from a previous pump cycle.

Figure 3:
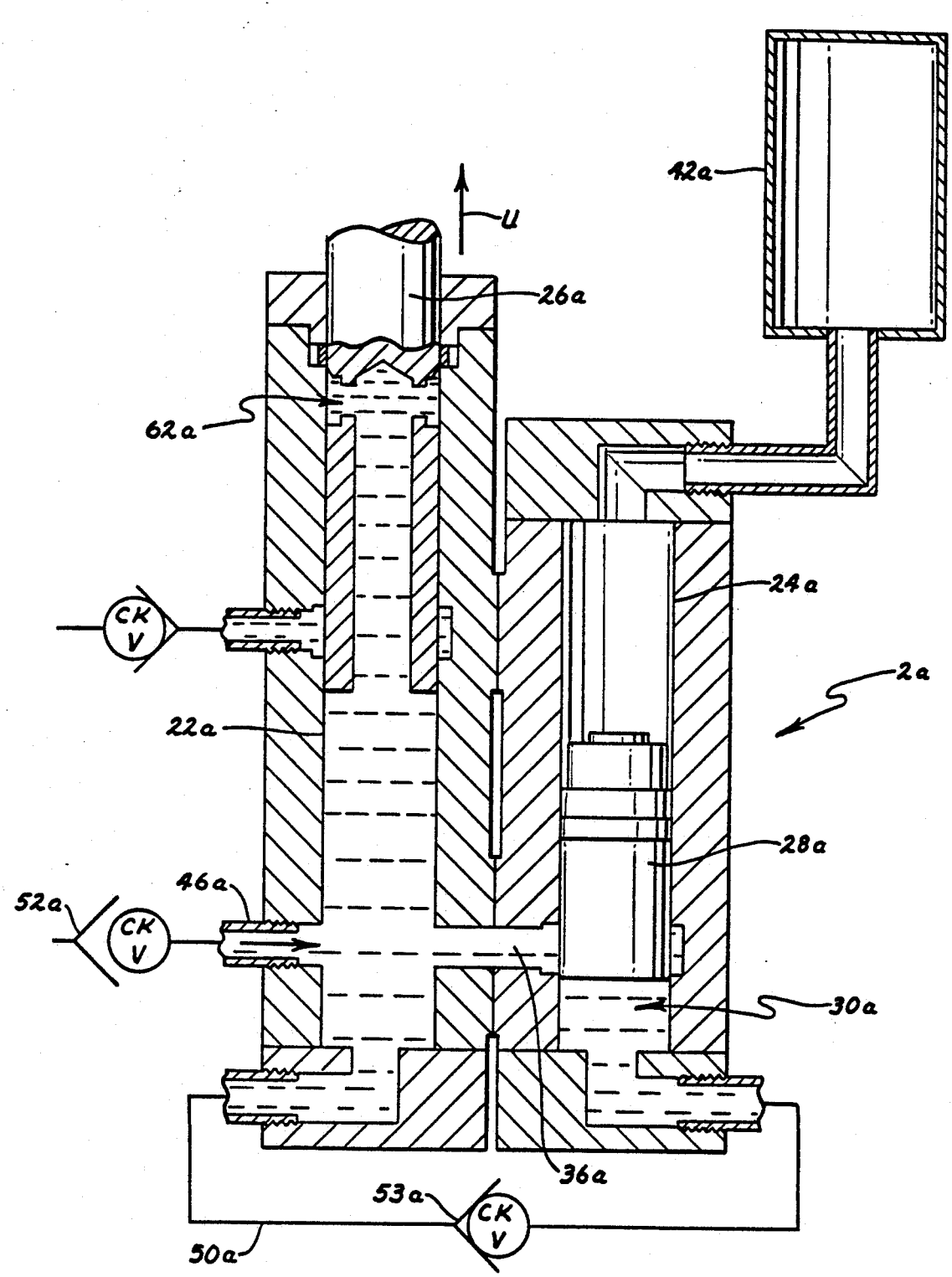
FIG. 3 is a cross-sectional view of the high pressure water pump apparatus shown in FIG. 2, illustrating the drive piston on the upstroke thereof but showing the pump piston still in its lowered position with the pump chamber having its minimum volume.

Referring now to FIG. 3, as drive piston 26a is raised by crankarm 14, the suction in drive bore 22a will be sufficient to open the first inlet check valve 52a and bring a slug or charge of water into drive bore 22a through main inlet 46a. This water will stay within drive bore 22a during upstroke U of drive piston 26a because it is prevented from flowing through outlet passage 36a into pump chamber 30a as pump piston 28a is covering outlet passage 36a and because second check valve 53a in liquid supply line 50a will remain closed. Accordingly, during upstroke U of drive piston 26, some water is brought into pump body 20a to fill drive bore 22a, but this water is not yet transferred to pump chamber 30a.

Referring now to FIG. 4, as drive piston 26a begins its downstroke D, it will quickly build up pressure in the water in drive bore 22a to open the second check valve 53a in liquid supply line 50a. Thus, water can begin to flow through line 50a and through inlet 34a into the lower portion of pump chamber 30a, as illustrated by arrows I, to raise pump piston 28a upwardly. Once pump piston 28a clears annular outlet port 38, water can also flow into pump chamber 30a through outlet passage 36a as indicated by the arrow I in passage 36a. In any event, as drive piston 26a comes downwardly, the charge of water that was brought into drive bore 22a is now transferred into pump chamber 30a, with pump piston 28a moving upwardly in a volume expanding direction and with the volume of pump chamber 30a expanding to accommodate the inflow of water.

As pump piston 28a moves upwardly as shown in FIG. 4, it simultaneously compresses the gas in gas reservoir 42a, as illustrated by the arrows C in FIG. 4, to increase the energy stored in gas reservoir 42a. The parts are so dimensioned that pump piston 28a will rise almost to the top of pump bore 24a as a charge or slug of water is brought into pump chamber 30a. In this location, the energy of the gas in gas reservoir 42a has been substantially increased.

Figure 5:
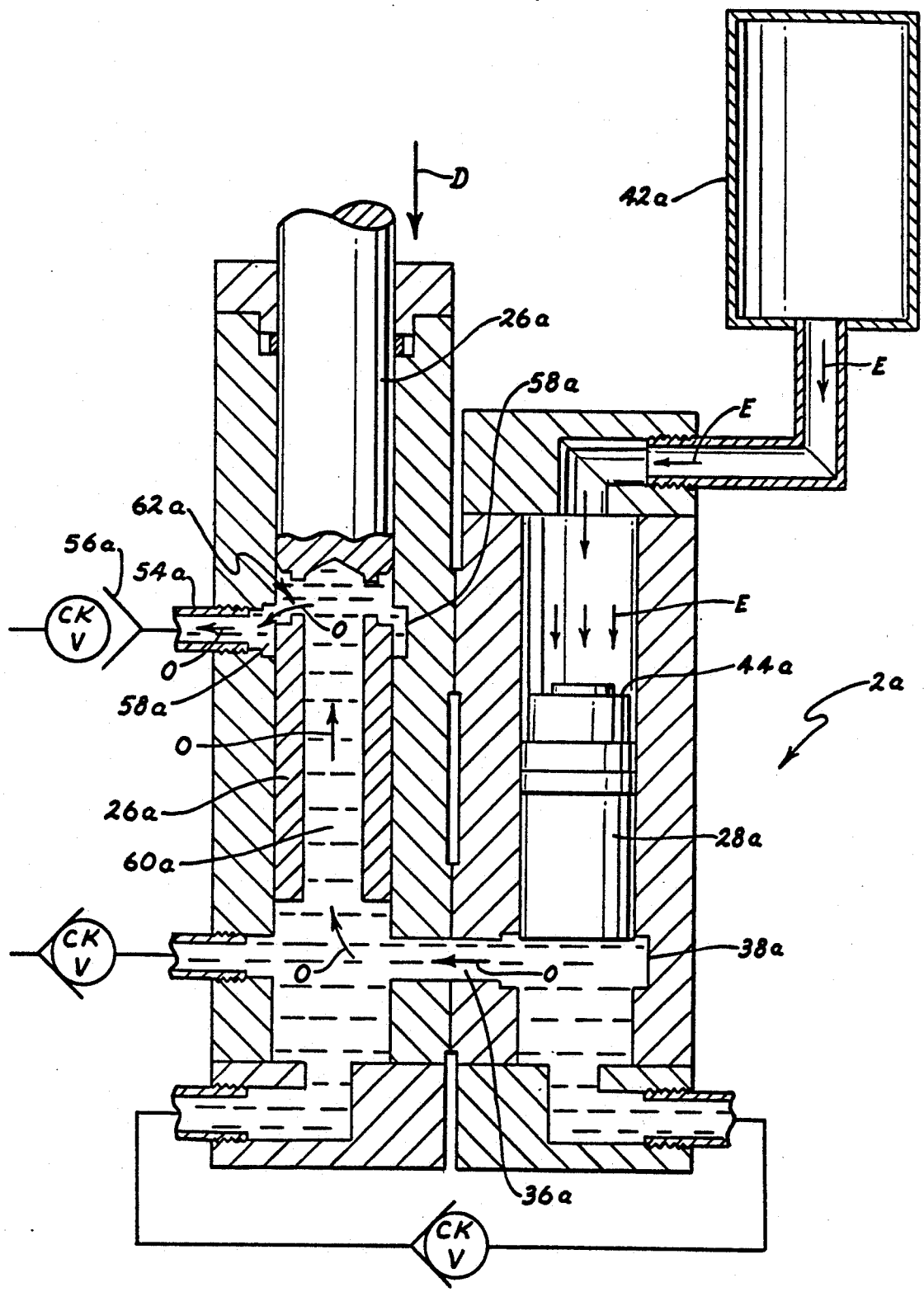
FIG. 5 is a cross-sectional view of the high pressure water pump apparatus shown in FIG. 2, but illustrating the components thereof in a fourth position in which the energy stored in the gas reservoir has been released to drive the pump piston downwardly in the pump chamber to pump the liquid therein out through an outlet of the pump chamber.

Turning now to FIG. 5, the last step in the pump cycle will be described. As drive piston 26a approaches the end of its downward stroke, the annular spool valve 62a contained on drive piston 26a will begin to register with outlet port 58a in drive bore 22a. In FIG. 4, spool valve 62a is not yet shown in registration. But, in FIG. 5, spool valve 62a is shown beginning its registration with outlet port 58a. As soon as this happens, an outlet path for the water contained in pump chamber 30a is provided. Namely, the water in pump chamber 30a can now exit through annular outlet port 38a, through outlet passage 36a of pump chamber 30a into the lower portion of drive bore 22a, then up through flow passage 60a in drive piston 26a itself, and finally out through spool valve 62a and outlet port 58a and into main liquid outlet 54a to open check valve 56a. Note the outlet flow arrows labelled O in FIG. 5.

As soon as an outlet path for the liquid in pump chamber 30a is established, the liquid in pump chamber 30a is no longer blocked or restricted from flowing. At that moment in time, the energy that has been built up in gas reservoir 42a is free to act on the upper face 44a of pump piston 28a to explosively drive pump piston 28a downwardly. This explosive downward acceleration of pump piston 28a, as indicated by the arrows E in FIG. 5, will quickly evacuate the liquid contained in pump chamber 30a through the outlet path just described to form a high pressure burst or pulse of water. This water will be supplied to nozzle jet manifold 8, and hence to nozzles 10, for forming high pressure liquid jets.

The peak pressure of the liquid being pumped out of pump chamber 30a is at least 2,300 psi and, preferably, at least 5,000 psi. A water pressure of approximately 5,000 psi gives good results when the pump apparatus is used to create high pressure water jets used for the soil cultivation purposes shown and claimed in the above-mentioned Toro patents.

The location of annular outlet port 38a for pump chamber 30a above the lowermost end of chamber 30a cushions pump piston 28a in its downward movement. Pump piston 28a will be explosively driven downwardly to force the water out of pump chamber 30a through the annular outlet port 38a, but this will occur only until pump piston 28a reaches the lower edge of outlet port 38a to seal it off. Once this port is sealed, any remaining liquid in pump chamber 30a, which is prevented from flowing rearwardly out of pump chamber 30a by check valve 53a, slows the downward movement of pump piston 28a and stops pump piston 28a short of the end of pump bore 24a. Thus, pump piston 28a is not driven or impacted with great force against the end of pump bore 24a. This provides increased durability and reliability for water pump apparatus 2a.

A major advantage for water pump apparatus 2a is the ability to drive pump piston 28a at substantially different speeds during a single pump cycle, i.e. at a first relatively slow speed during the time when pump chamber 30a is being filled with water and at a second speed which is substantially faster than the first speed when pump chamber 30a is being emptied of water. This occurs even though the mechanical drive means for pump piston 28a operates at generally the same speed throughout the pump cycle. Drive piston 26a elevates pump piston 28a in its volume expanding direction at the first speed. The liquid column extending between drive piston 26a and pump piston 28a operatively couples the two together over a portion of the movement of drive piston 26a such that the liquid column pushes pump piston 28a upwardly when drive piston 26a moves downwardly against the liquid column. See FIG. 4 for the elevation of pump piston 28a. The first speed imparted to pump piston 28a is preferably about the same speed at which drive piston 26a is then being driven, but this is not necessarily so. The parts could be dimensioned so that pump piston 28a is elevated at a different speed from the speed at which drive piston 26a is being driven, but in any event pump piston 28a will be elevated upwardly at some pre-determined first speed as drive piston 26a moves downwardly in drive bore 22a.

However, because pump piston 28a is mechanically separate from drive piston 26, when a pumping action is required and annular spool valve 62a registers with outlet port 58a, the interconnection provided by the liquid column is broken. The energy stored in gas reservoir 42a is then free to quickly accelerate pump piston 28a downwardly at a much faster rate or speed than the first speed at which pump piston 28a was raised. It is this relatively quick downward movement of pump piston 28a in pump chamber 30a that drives the water out of pump chamber 30a and out of pump body 20a.

Figure 13:
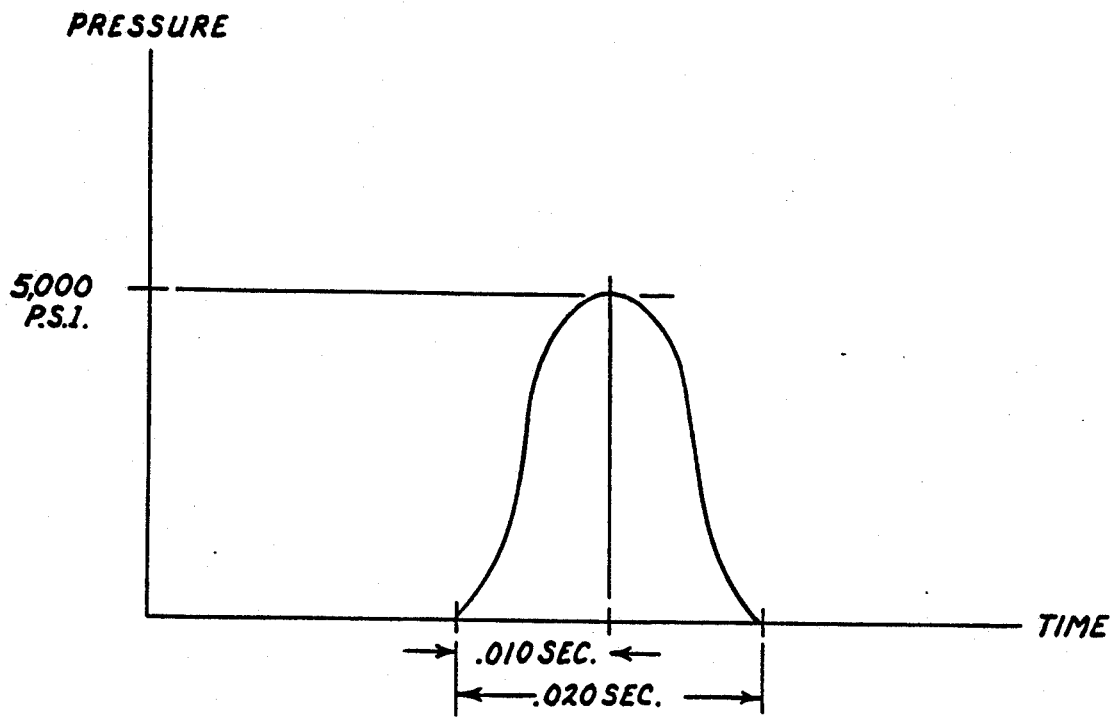
FIG. 13 is a pressure diagram showing the increase and decrease in pressure over time of a liquid being pumped from the pump chamber of a prior art reciprocal piston type pump in a single pump cycle.

As a practical matter, water pump apparatus 2a avoids the sinusoidal increase and decrease in water pressure occurring during the reciprocal motion of a conventional reciprocal piston type pump. In such a conventional pump in which a pump piston simply reciprocates back and forth in a pump chamber at generally the same speed in each direction, the pressure will increase and decrease in a sinusoidal pattern with a gradual buildup to a peak and then a gradual falloff. While this serves to pump the liquid at an increased pressure, the pressure increase always occurs in this gradual sinusoidal fashion. FIG. 13 is an illustration of a typical sinusoidal pressure pattern occurring with a prior art reciprocal piston type pump.

Figure 14:
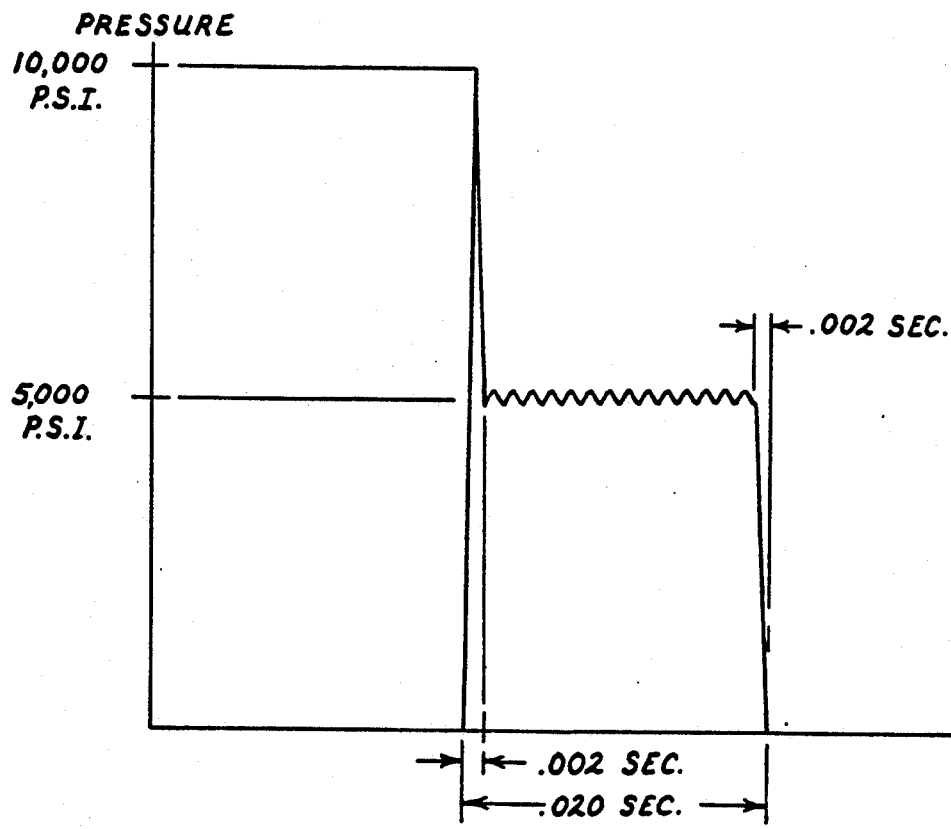
FIG. 14 is a pressure diagram showing the increase in pressure over time of a liquid being pumped from the pump chamber of a water pump apparatus according to the present invention in a single pump cycle.

However, water pump apparatus 2a of the present invention, with the relatively quick, explosive downward movement of pump piston 28a at a speed much faster than the first speed at which it was raised, is believed to create a pressure pattern which is much squarer and includes a beginning high pressure spike. In other words, the pressure increase in the water in pump chamber 30a is not gradual over time, but first spikes upwardly somewhat above its desired level and then settles down to the desired level and stays approximately there for a time until falling off rapidly. The pressure pattern from water pump apparatus 2a of the present invention is illustrated in FIG. 14. It has been found that the pressure pattern from water pump apparatus 2a as shown in FIG. 14 is much more efficient in creating openings in turf than the sinusoidal pattern of FIG. 13.

These important advantages accrue in a pump apparatus 2a using a drive piston 26a which is simply and reliably driven from a crankshaft 12. In addition, apparatus 2a is self-timing as the timing for the operation of the various components arises simply due to the reciprocation of drive piston 26a. Drive piston 26a, for example, itself carries the valving apparatus 62a that frees pump piston 28a from drive piston 26a to allow the energy in chamber 42a to accelerate pump piston 28a downwardly. Thus, no separate timing apparatus is required for a separate water supply valve connected to a separate accumulator—these components are no longer required. Accordingly, water pump apparatus 2a of this invention is highly reliable and cost effective.

Another advantage of separating drive piston pump piston 28a, and allowing pump piston 28a to have independent movement, is that the mass of pump piston 28a can be minimized. Preferably, pump piston 28a weighs many times less than the mass of drive piston 26a and crankarm 14. For example, pump piston 28a can weigh approximately 0.75 pounds whereas the drive piston 26a and crankarm 14 combination may weigh approximately 15 pounds. Thus, for a given amount of energy stored in gas reservoir 42, this energy can accelerate pump piston 28a at a faster acceleration rate than that obtainable if the same amount of energy were also applied to drive piston 26a and crankarm 14. Accordingly, water pump apparatus 2a is also considerably more efficient.

The first and second speeds of movement of pump piston 28a can have different values. Referring to the sinusoidal pressure pattern of FIG. 13, with crankshaft 12 operating at 300 rpm, it takes approximately 200 milliseconds to complete one pump cycle divided generally equally between the upstroke and the downstroke, i.e. approximately 100 milliseconds in the upstroke and 100 milliseconds in the downstroke, in a pump apparatus 2a dimensioned to provide approximately 4 cubic inches of water per stroke of pump piston 28a. The pump piston 28a is elevated to fill pump chamber 30a in approximately the length of time that it takes to drive piston 26a through its downstroke, i.e. it takes between 80 and 100 milliseconds for pump piston 28a to fill pump chamber 30a. However, under the influence of the stored energy in gas reservoir 42a, the pump piston 28a is completely driven downwardly through pump chamber 30a to pump the water out of pump chamber in a time interval of from 2 to 10 milliseconds. Thus, the second speed of pump piston 28a is as many times more than the first speed as is needed to substantially achieve the squarer pressure pattern of FIG. 14. For the embodiment of the invention described above having the operational parameters described above, the second speed of pump piston 28a is in the range of from 8 to 50 times faster than the first speed.

It should also be apparent that the first and second speeds referred to above may not be constant over the stroke of pump piston 28a in its upstroke and its downstroke. Thus, the phrases "first speed" or "second speed" can refer either to the actual speed at a particular point in the upstroke or the downstroke, i.e. at the midpoint of each stroke, or to the average speed in the upstroke or the downstroke, or to the maximum speed achieved in the upstroke or the downstroke. It is the relative increase in the second speed relative to the first speed that is important, and not to the actual measure used for that speed. Thus, the phrases "first speed" and "second speed" as used herein do not refer to a constant speed.

Figure 6:
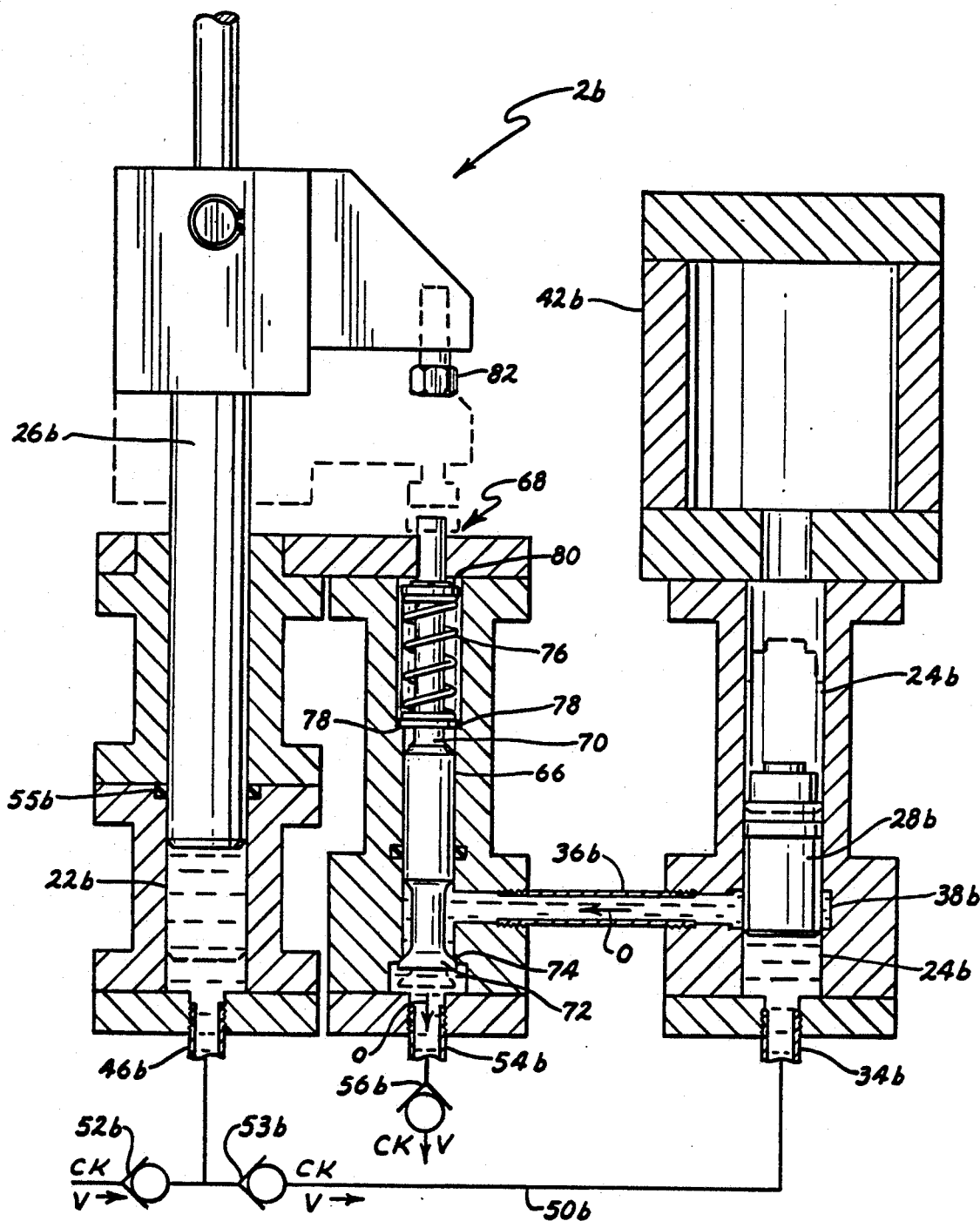
FIG. 6 is a side elevational view of a second embodiment of the high pressure water pump apparatus according to the present invention, particularly illustrating an embodiment which is a modified version of the first embodiment shown in FIGS. 2–5.

The Embodiment of FIG. 6

Referring now to FIG. 6, a second embodiment of a water pump apparatus according to the present invention is illustrated as 2b. Pump apparatus 2b is similar in concept to pump apparatus 2a just described with respect to FIGS. 2-5. For example, there is a pump body 20b, a reciprocal drive piston 26b contained in a cylindrical drive bore 22b, and a reciprocal pump piston 28b contained in a separate, cylindrical pump bore 24b. Pump piston 28b can compress a gas contained within a pressurized gas reservoir 42b as it moves upwardly. A pump chamber 30b is formed in pump bore 24b between the lower face of pump piston 28b and the lower end of pump bore 24b.

The primary difference between the embodiment shown in FIG. 6 and that shown in FIGS. 2-5 is the valving apparatus used for releasing pump piston 28b for its downward, volume contracting movement in pump chamber 30b. In the first embodiment shown in FIGS. 2-5, the valving apparatus comprises a spool valve 62a located on the outer diameter of drive piston 26a. Moreover, the outlet path for the liquid leaving pump chamber 30a, as illustrated by the arrows O in FIG. 5, passed at least partially through drive bore 22a on its way to the main liquid outlet 54a. However, in the embodiment shown in FIG. 6, there is no such spool valve contained on drive piston 26b. Instead, a third cylindrical bore 66 is provided in pump body 20b which bore carries a spring loaded poppet valve, indicated generally as 68. In addition, the outlet path O for the liquid contained in pump chamber 30b is no longer through drive bore 22b, but through a lower portion of valve bore 66.

Referring more particularly to poppet valve 68, this valve comprises an elongated rod 70 that extends through valve bore 66 and includes a valve head 72 which seals against a valve seat 74 in the lower portion of valve bore 66. A compression spring 76 surrounds rod 70 and acts between a fixed abutment 78 in valve bore 66 and a flange 80 on rod 70 to bias rod 70 upwardly to normally close poppet valve 68. In this position, valve head 72 is forced against valve seat 74 to prevent any liquid from being discharged from pump chamber 30b. However, an actuating member 82 fixed to drive piston 26b for movement therewith can engage against the upper end of rod 70 to depress rod 70 against the biasing force of spring 76. When this occurs, valve head 72 will move downwardly from valve seat 74, as illustrated in phantom lines in FIG. 6, to open outlet passage 36b and allow liquid to leave pump chamber 30b.

The operation of pump apparatus 2b shown in FIG. 6 is similar to that described in FIGS. 2-5. During the upstroke of drive piston 26b, a slug of water will be drawn into drive bore 22b past first check valve 52b. However, this water will not be transferred to pump chamber 30b until drive piston 26b begins to move downwardly. When this happens, the water in drive bore 22b can flow past second check valve 53b and into the bottom of pump chamber 30b to raise pump piston 28b upwardly and compress the gas in gas reservoir 42b. Poppet valve 68 remains seated to block any exit of liquid from pump chamber 30b as piston 28b is raised to fill pump chamber 30b with water.

Drive piston 26b continues in its downward path until such time as actuating member 82 on drive piston 26b engages rod 70 of poppet valve 68, i.e. at or near the end of the downstroke of drive piston 26b. This will depress rod 70 to open poppet valve 68 as described above. As soon as poppet valve 68 opens, an outlet path O for the liquid contained in pump chamber 30b is established. This outlet path extends from outlet passage 36b of pump chamber 30b through valve bore 66 to the main liquid outlet 54b which is now at the bottom of valve bore 66 as indicated by the arrows O in FIG. 6. As soon as poppet valve 68 opens, the energy stored in gas reservoir 42b will quickly accelerate pump piston 28b downwardly to cause the liquid to be pumped out of pump chamber 30b through outlet path O.

In all respects, water pump apparatus 2b as shown in FIG. 6 has many of the same advantages possessed by apparatus 2a described in FIGS. 2-5. For example, pump piston 28b is still separate from drive piston 26b so that only the mass of pump piston 28b has to be accelerated downwardly and not the mass of drive piston 26b and crankarm 14 as well. An annular water cushion is provided in pump chamber 30b to cushion and stop pump piston 28b in its downward stroke. The upper face of pump piston 28b is acted upon by an energy source the stored energy of which is increased during the upward movement of pump piston 28b.

As noted above, the primary difference between the two embodiments is simply that a separate poppet valve 68 is used in FIG. 6 whereas the valve used in FIGS. 2-5 for the control action was an integral spool valve 62a on drive piston 26b. Poppet valve 68 has a firm closing action, provided by spring 76, and may be somewhat less susceptible to leakage than a spool valve 62. In addition, poppet valve 68 could be periodically opened by some alternative actuating element, such as an electrical solenoid, instead of using actuating member 82 on drive piston 26b, which solenoid would be triggered in a timed relationship to the movement of drive piston 26b, if this is desired.

The Embodiment of FIGS. 7-10

In the two embodiments of water pump apparatus 2a or 2b previously described, drive piston 26 and pump piston 28 were housed in separate cylindrical bores 22 and 24, respectively, in the pump body. The upward movement of drive piston 26 first brought a slug or charge of liquid into drive bore 22, but this charge of liquid had to be then transferred into pump chamber 30 to be acted upon by the pump piston. Accordingly, various connecting passages, for liquid inlet and outlet purposes, had to be established between the drive and pump bores 22 and 24.

A third embodiment of water pump apparatus is shown in FIGS. 7-10 as 2c. Pump apparatus 2c is simplified because there is only one cylindrical bore in pump body 20c which reciprocally carries both pump piston 28c and drive piston 26c. This single bore is illustrated as 23 in FIGS. 7-10 and will be referred to herein as the drive/pump bore because it houses both the drive and pump pistons.

In addition, pump apparatus 2c has an aligned, coaxial relationship between the drive and pump pistons 26c and 28c. Pump piston 28c is still mechanically separate from drive piston 26c, but it is releasably attached to drive piston 26c so that it moves with drive piston 26c in the upward stroke of drive piston 26c. In effect, drive piston 26c pulls pump piston 28c up with it in its upstroke U. However, near the conclusion of upstroke U of drive piston 26c, and at that point in time at which it is desired to explosively accelerate pump piston 28c downwardly to cause a water pumping action, pump piston 28c is detached from drive piston 26c so that it can move down independently of drive piston 26c.

Figure 7:
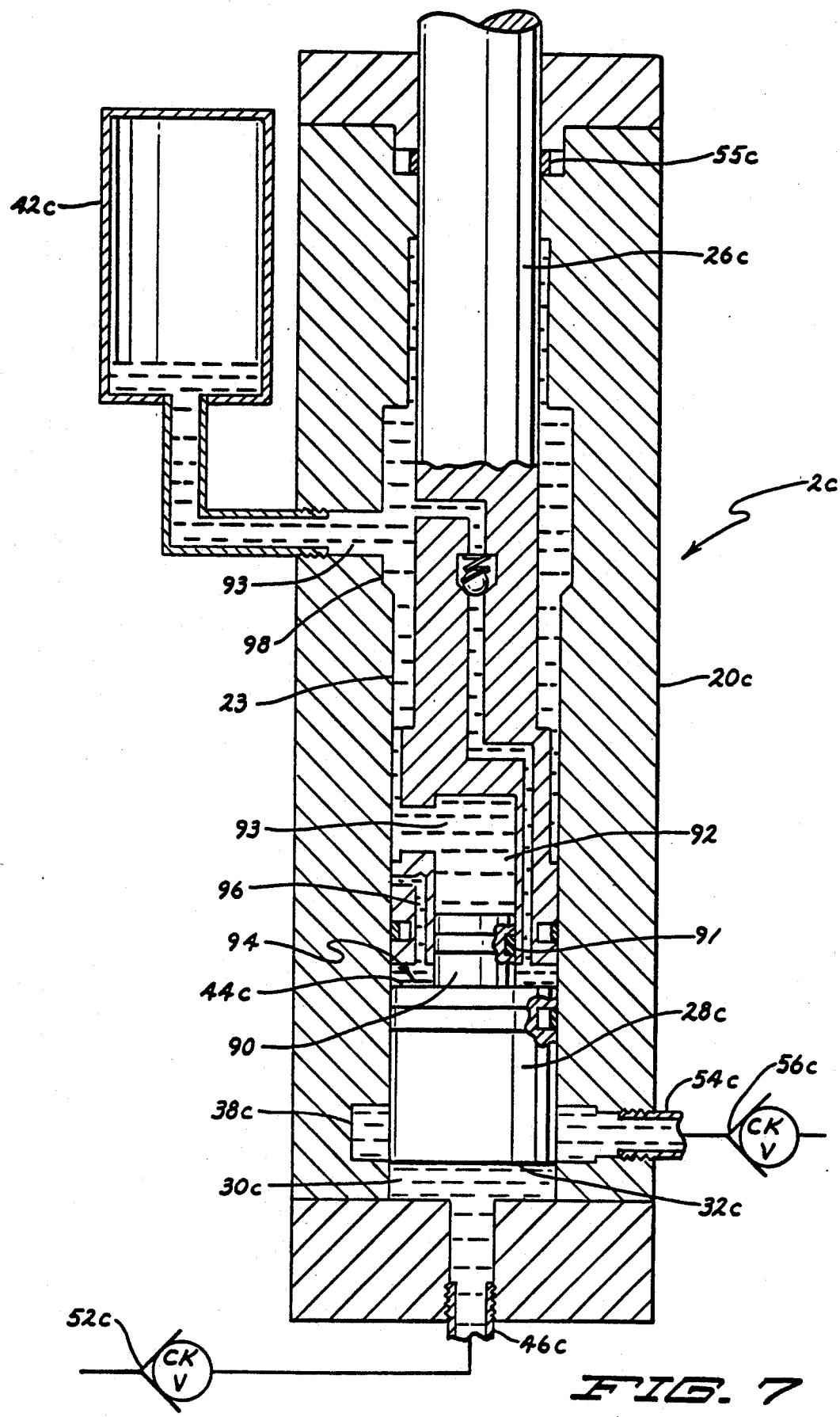
FIG. 7 is a cross-sectional view of a third embodiment of a high pressure water pump apparatus according to the present invention, particularly illustrating the components of the apparatus in a first position prior to the upstroke of the drive piston with the pump chamber having its minimum volume.

FIG. 7 illustrates the arrangement of components at the beginning of a pump cycle. Pump piston 28c comprises a cylindrical body, much like that shown in the prior embodiments, but also now includes a central, upwardly extending stem 90 having a peripheral seal 91. Stem 90, having a smaller diameter than the main body of pump piston 28c, is telescopically received in a central socket or passage 92 provided on the lower end of drive piston 26c. While stem 90 fits into passage 92, stem 90 is not directly connected to drive piston 26c, i.e. stem 90 can move into and out of passage 92, such that pump piston 28c is still independently movable relative to drive piston 26c.

The portion of drive/pump bore 23 above the upper face 44c of pump piston 28c is filled with a relatively incompressible sealing medium such as oil, illustrated generally as 93. This oil can be a hydraulic oil of the type used in hydraulic motors and the like. This oil comprises a novel and unique way of operatively connecting pump piston 28c to drive piston 26c as will be explained shortly.

The oil 93 provided in drive/pump bore 23 substantially fills drive/pump bore 23 above the level of the upper face of the main body of pump piston 28c and can extend at least somewhat into the lower portion of gas reservoir 42c, which reservoir 42c is operatively coupled to drive/pump bore 23. The energy stored in reservoir 42c can be applied against the upper face of pump piston 28c since passage 92 operatively communicates with chamber 42c through the oil column contained in drive/pump bore 23. However, there is an unoccupied volume in gas reservoir 42c above the level of the oil in which a compressible gas is still received. This gas will be compressed during the operation of water pump apparatus 2c as will be explained hereafter.

Pump piston 28c does not seat directly against the lower end of drive piston 26c. Instead, there is a small chamber 94 in which a supply of oil will be contained. When the stem of pump piston 28c is received inside passage 92 at the lower end of drive piston 26c, an oil seal is created in oil chamber 94 that serves to attach or adhere pump piston 28c to drive piston 26c. In other words, as drive piston 26c moves upwardly in its upstroke, the oil seal in chamber 94 will pull pump piston 28c up with it even though pump piston 28c is located below drive piston 26c.

The operation of pump apparatus 2c is shown sequentially in FIGS. 7-10. FIG. 7 discloses the orientation of the parts at the lowermost stroke of crankshaft 12. In this orientation, pump piston 28c has stem 90 sealingly received within passage 92 in drive piston 26c and the pump assembly comprising the conjoined drive piston 26c and pump piston 28c is at its lowermost point in drive/pump bore 23. In this orientation, pump chamber 30c, which is formed between the lower end of drive/pump bore 23 and lower face 32c of pump piston 28c, has its minimum contracted volume. A small amount of liquid cushion is still retained in pump chamber 30c due to the location of annular port 38c and outlet passage 36c above the lower end of pump chamber 30c as described with respect to the prior embodiments.

Figure 8:
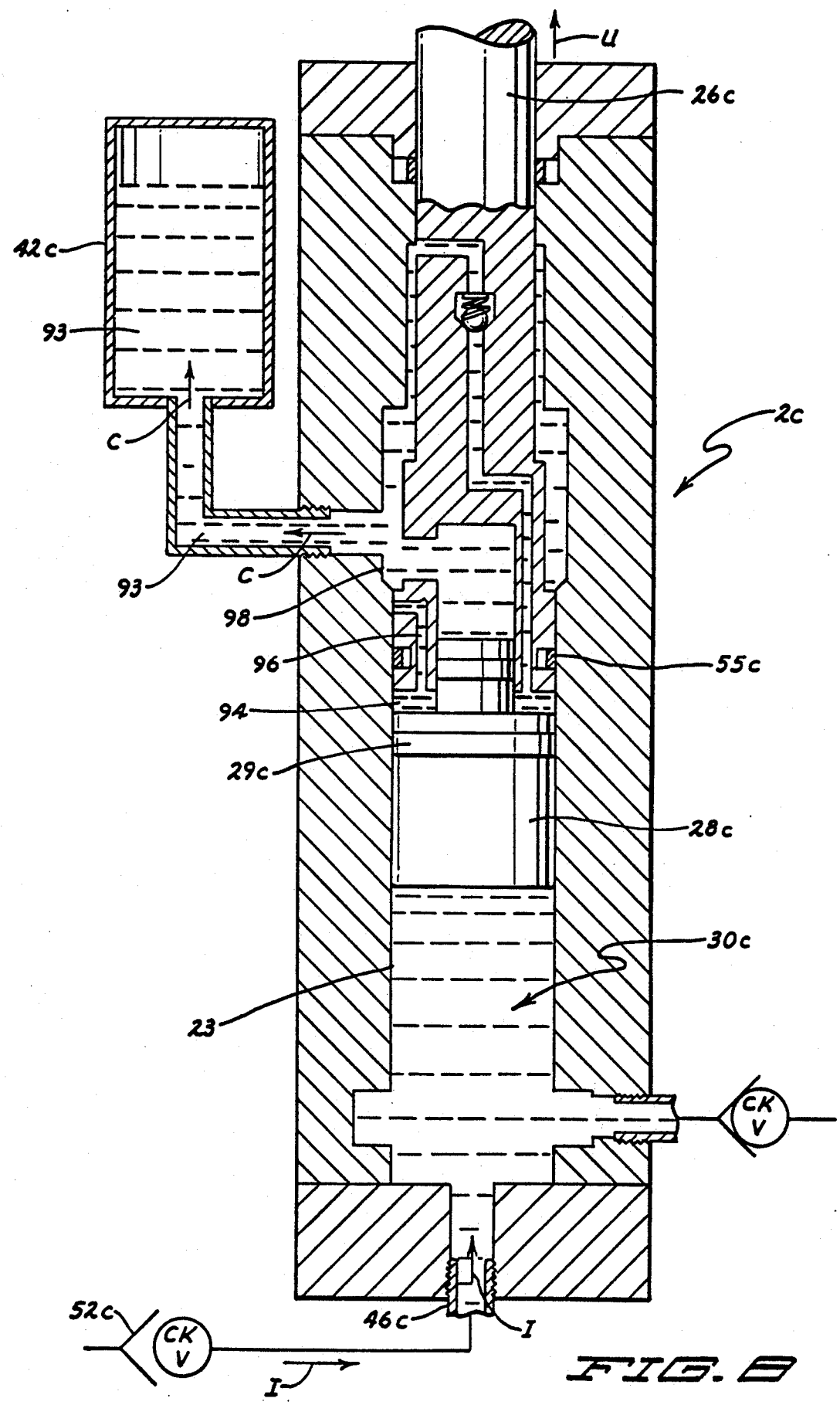
FIG. 8 is a cross-sectional view of the high pressure water pump apparatus shown in FIG. 7, but illustrating the components thereof in a second position during the upstroke of the drive piston showing the volume of the pump chamber having been expanded as water fills the pump chamber and showing the volume occupied by the gas in the gas reservoir having been compressed.

Referring now to FIG. 8, as drive piston 26c rises, it will carry with it pump piston 28c due to the oil seal formed between the two in chamber 94. As this occurs, the volume of pump chamber 30c expands and water flows into pump chamber 30c through main inlet 46c, which main inlet 46c is now also the inlet for pump chamber 30c. See the arrows I which depict the inlet flow of water. During this upward movement of drive piston 26c, the oil level will also rise inside gas reservoir 42c to compress the gas within that chamber and increase the pressure therein. This rise in the volume of the oil within gas reservoir 42c is illustrated in FIG. 8 by the compression arrows C.

As long as the oil seal is maintained between pump piston 28c and drive piston 26c, the upward movement of drive piston 26c will carry with it pump piston 28c. What has to happen for a pumping action to occur is for the oil seal between the two to be broken which would allow the energy stored in gas reservoir 42c to act against the upper face 44c of pump piston 28c, by acting through passage 92 against stem 90 thereof, to drive pump piston 28c downwardly. The oil seal between the two is broken by opening oil chamber 94 to the rest of the oil contained in the oil column at some point in the upward movement of drive piston 26c. This is accomplished by a bleed passage 96 that extends from oil chamber 94 to an outer diameter of drive piston 26c. Normally, bleed passage 96 is sealed by the walls of drive/pump bore 23. However, at some point in the upward movement of drive piston 26c, and preferably at approximately the end of the upstroke U of drive piston 26c, the outlet end of bleed passage 96 encounters a valve portion 98 of drive/pump bore 23 of greater diameter. This uncovers bleed passage 96 and allows some of the oil in the oil column above pump piston 28c to enter chamber 94 to break the oil seal between drive piston 26c and pump piston 28c.

FIG. 8 illustrates the pump components in their position as they move upwardly, but immediately before bleed passage 96 is uncovered. In this configuration, pump piston 28c has risen to expand the volume of pump chamber 30c, and to draw a slug or charge of water directly into pump chamber 30c. The gas has been compressed in gas reservoir 42c to increase the energy stored in gas reservoir 42c. But, the oil seal between pump piston 28c and drive piston 26c is intact because bleed passage 96 is still sealed by the walls of drive/pump bore 23.

Figure 9:
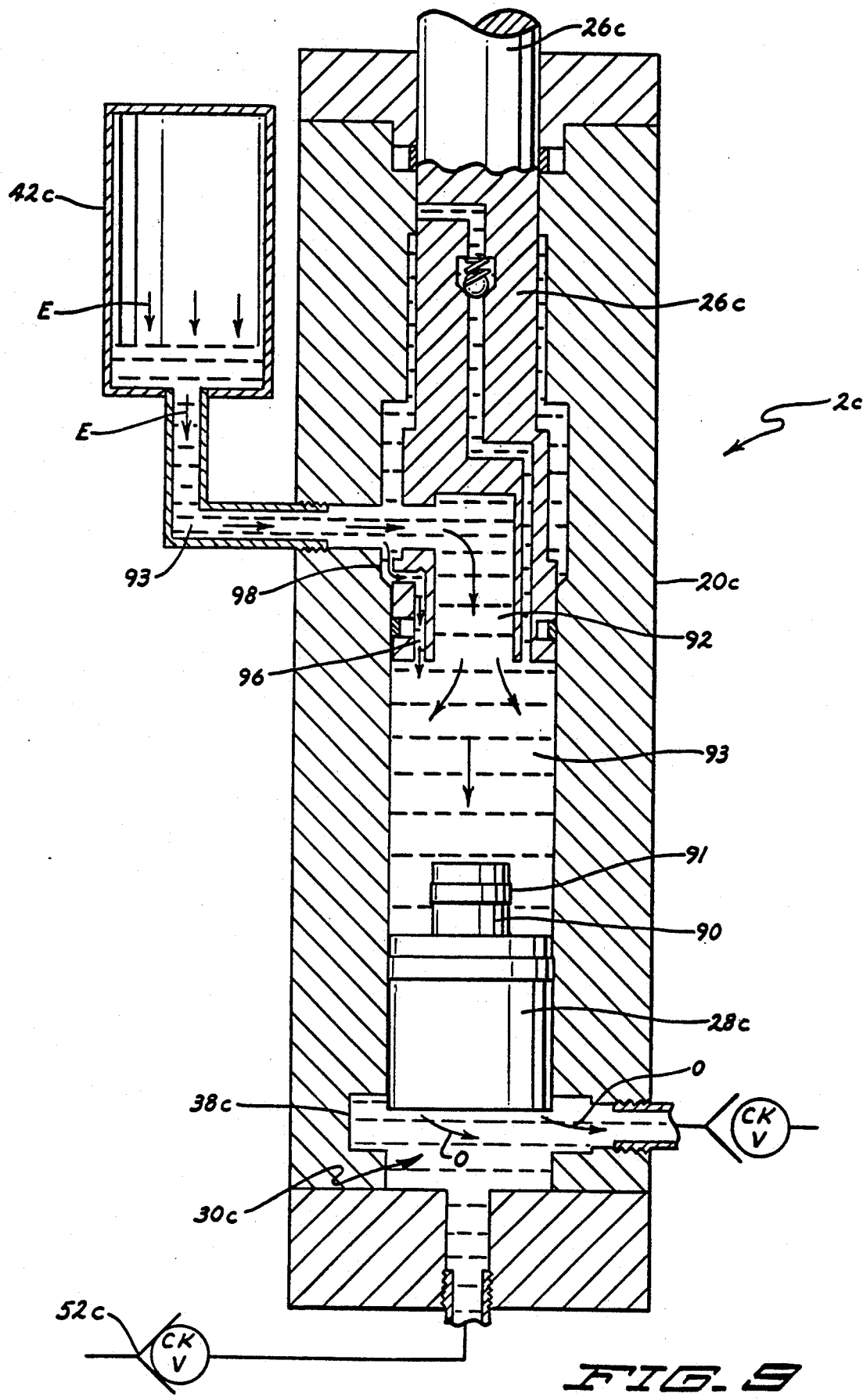
FIG. 9 is a cross-sectional view of the high pressure water pump apparatus shown in FIG. 7, but illustrating the components thereof in a third position in which the upstroke of the drive piston has continued sufficiently far such that the energy stored in the gas reservoir is released to separate the pump piston from the drive piston and drive the pump piston downwardly to contract the volume of the pump chamber and pump the water in the pump chamber out through the outlet.

Referring now to FIG. 9, as soon as bleed passage 96 reaches the valve portion 98 of drive/pump bore 23, the oil seal between pump piston 28c and drive piston 26c is broken. As soon as this occurs, the energy stored in gas reservoir 42c acting on the oil column, and now against both stem 90 of pump piston 28c as well as the upper face of the main body of pump piston 28c, is able to detach pump piston 28c from drive piston 26c and to explosively drive pump piston 28c downwardly. See the expansion arrows E in FIG. 9. This causes the liquid contained in pump chamber 30c to be driven out of main outlet 54c and past check valve 56c. See the outlet arrows O in FIG. 9. Again, main outlet 54c of pump body 20c is also the outlet for pump chamber 30c because of the use of a single drive/pump bore 23. Accordingly, the explosive downward movement of pump piston 28c effects the same type of improved high pressure pumping as is true in the other embodiments.

Figure 10:
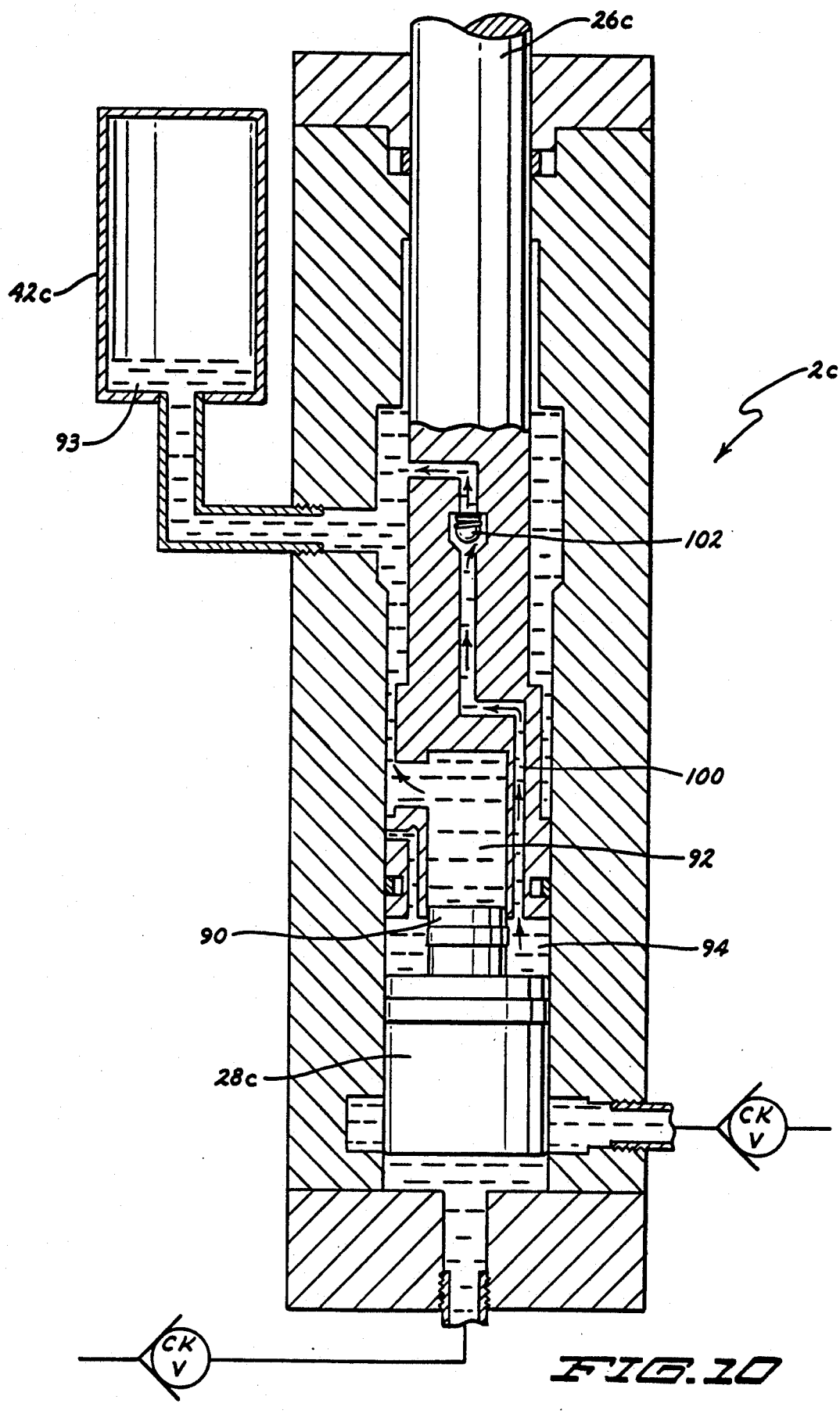
FIG. 10 is a cross-sectional view of the high pressure water pump apparatus shown in FIG. 7, but illustrating the components thereof in a fourth position in which the drive piston is on the downstroke and is approaching the separated pump piston to reattach itself to the pump piston at the conclusion of a first pump cycle.

Referring finally to FIG. 10, as drive piston 26c returns downwardly in its downstroke D, it will at some point approach pump piston 28c after pump piston 28c has been detached and has completed the liquid pumping action. Drive piston 26c has to reacquire and reattach itself to pump piston 28c for the next pump cycle. This would normally be prevented because the oil in the drive/pump bore 23 would prevent stem 90 from fully reseating and resealing in central passage 92 of drive piston 26c. However, a pressure relief passage 100 protected by a spring biased check valve 102 is provided in the lower end of drive piston 26c. As stem 90 enters passage 92, check valve 102 opens to allow excess oil that is trapped between pump piston 28c and drive piston 26c to pass out through relief passage 100 in order to allow stem 90 to continue to move up into passage 92. The parts are so dimensioned and the strength of check valve 102 is so selected that the pressure starts to equalize before all the oil passes out of chamber 94. The spring in check valve 102 will then reseat the check valve while there is some oil left in chamber 94 to reestablish the oil seal between pump piston 28c and drive piston 26c.

Pump apparatus 2c is compact since only a single cylindrical drive/pump bore 23 is required. In addition, the liquid inlet and outlet paths to pump chamber 30c are simplified because only a single drive/pump bore 23 is used in the pump body. Accordingly, it is not necessary to find a way to transfer the liquid charge from a separate drive bore to the pump chamber and then from the pump chamber back out through either the drive bore or a valve bore. Instead, the liquid enters directly into pump chamber 30c and exits directly out of pump chamber 30c.

In addition, the use of a relatively incompressible oil to create an oil seal between pump piston 28c and drive piston 26c is quite effective in temporarily attaching pump piston 28c to drive piston 26c. The use of the oil to substantially fill the drive/pump bore 23 also creates a reliable valving apparatus. In this regard, bleed passage 96 that cooperates with valve portion 98 of drive/pump bore 23 to break the oil seal is always exposed just to oil and not to water. Oil is a better and more reliable sealing medium than water. Accordingly, it is believed that the sealing and valving actions required for apparatus 2c to operate will be extremely reliable and durable over time.

Nonetheless, water pump apparatus 2c as shown in FIGS. 7-10 has those same advantages previously described with regard to the other embodiments. Again, pump piston 28c is separate from drive piston 26c, is very light compared to the mass of drive piston 26c and crankarm 14 as described previously, and is separately accelerated away from drive piston 26c by the energy stored in gas reservoir 42c. Accordingly, it is believed water pump apparatus 2c will create the preferred pressure pattern of FIG. 14, and not the sinusoidal pattern of FIG. 13, even though the pump apparatus 2c comprises a simple reciprocal piston assembly moved back and forth in a pump chamber by a crankshaft.

Referring to apparatus 2c, the valve which detaches pump piston 28c from drive piston 26c is formed by the registration of bleed passage 96 with a larger diameter valve portion 98 of drive/pump bore 23. Instead of this arrangement, controlled oil leakage could be provided around the lower end of drive piston 26c which leakage would allow enough oil to enter chamber 94 from the oil column to break the oil seal at or near the conclusion of the upstroke of drive piston 26c.

In apparatus 2c shown in FIGS. 7-10, the pump piston 28c is elevated during the upstroke of drive piston 26c, and not during the downstroke of drive piston 26c as in the earlier embodiments. However, for a pump apparatus being driven at 300 rpm and providing approximately 4 cubic inches of water during each stroke, the first and second speeds of pump piston 28c are generally the same as described earlier with regard to pump piston 28a, i.e. pump piston 28c is elevated in approximately 80 to 100 milliseconds and is driven downwardly in approximately 2 to 10 milliseconds.

Figure 11:
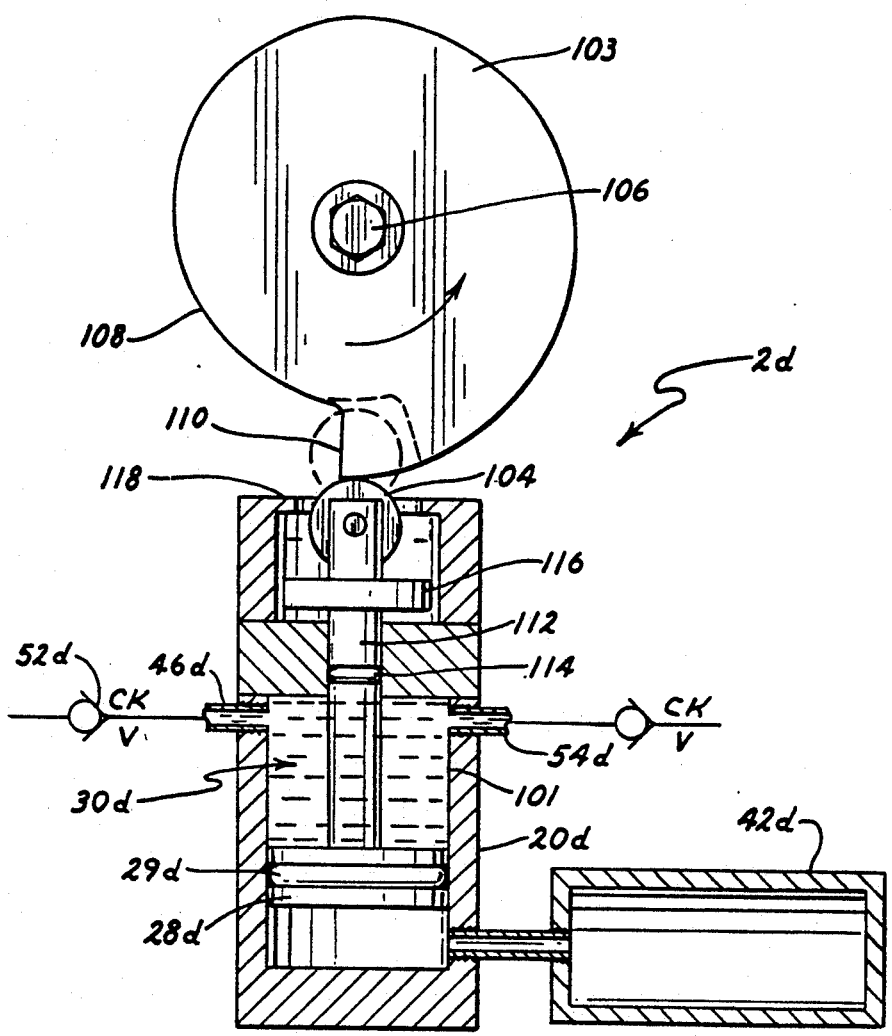
FIG. 11 is a cross-sectional view of a fourth embodiment of a high pressure water pump apparatus according to the present invention, particularly illustrating the pump piston in a second-position where the volume of the pump chamber has been expanded to fill the pump chamber with water and just prior to uncoupling the pump piston from the drive means to pump the liquid out of the pump chamber.
Figure 12:
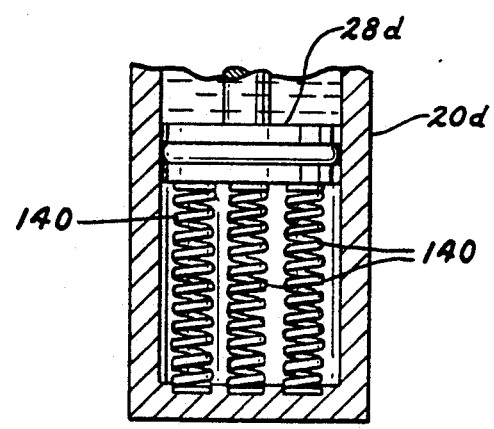
FIG. 12 is a partial cross-sectional view of a fifth embodiment of a high pressure water pump apparatus according to the present invention, particularly illustrating an alternative energy storing means for use in the pump apparatus.

The Embodiments of FIGS. 11 and 12

Referring now to FIG. 11, another embodiment of a pump apparatus according to the present invention is illustrated as 2d.

Pump apparatus 2d includes a pump body 20d having a single, liquid receiving cylindrical bore 101. A pump piston 28d is received in bore 101 and is sealed with respect to the side walls of bore 101 by any suitable sealing means 29d. A pump chamber 30d is formed between one end of bore 101 and the upper face of pump piston 28d. Pump chamber 30d is filled with water as pump piston 28d is moved downwardly to expand the volume of pump chamber 30d with water passing into chamber 30d through an inlet 46d. The water is pumped out of pump chamber 30d through an outlet 54d as pump piston 28d moves upwardly to contract the volume of pump chamber 30d.

An energy storing means in the form of a gas reservoir 42d is connected to the lower portion of bore 101 beneath the lower face of pump piston 28d. Thus, as pump piston 28d moves downwardly to fill pump chamber 30d with water, the gas contained in reservoir 42d is compressed to further increase the energy stored in reservoir 42d. Accordingly, gas reservoir 42d is intended to be an energy storing device similar to the gas reservoirs described with respect to the prior embodiments, and specifically gas reservoir 42d is pre-charged to a certain amount in the manner previously described.

The drive means for moving the pump piston 28*d* up and down is different in the embodiment of FIG. 11 from what was described previously. For one thing, the crankshaft 12 and crankarm 14 combination is replaced by a cam 103 and cam follower 104 arrangement. Cam 103 is secured to a drive shaft 106 that is continuously revolved by the engine or power source (not shown) of the pump apparatus 2*d* or of the implement on which the pump apparatus 2*d* is employed. This continuously revolves cam 103. Cam 103 is provided with a spiral rise 108 that terminates in a vertical, radially inwardly directed drop-off or ramp 110.

As can be seen in FIG. 11, pump piston 28*d* is provided with a stem 112 that extends outwardly of bore 101 to have a roller type cam follower 104 secured to its end. A chevron or O-ring type sealing means, shown as seal 114, is provided around stem 112 to prevent liquid from leaking out of pump chamber 30*d*. The pressure of the gas in gas reservoir 42*d* acts upwardly on pump piston 28*d* to force cam follower 104 into engagement with cam 103. In this arrangement, pump piston 28*d* is directly driven by cam 103—there is no separate drive piston 26*d* that transmits the motion of the mechanical power source to pump piston 28*d*.

At the beginning of a pump cycle, pump piston 28*d* will be raised inside bore 101 so that pump chamber 30*d* will have its minimum contracted volume. This is illustrated in phantom lines in FIG. 11. In this position, cam follower 104 is at the beginning of spiral rise 108 and there is a small amount of water remaining in pump chamber 30*d* from the previous pump cycle.

As cam 103 rotates, spiral rise 108 will act against cam follower 104 to move pump piston 28*d* downwardly inside bore 101, thus expanding the volume of pump chamber 30*d* and causing it to fill with water which passes inwardly past check valve 52*d*. At the end of spiral rise 108, the vertical, inwardly directed ramp 110 is encountered. As cam follower 104 becomes aligned with ramp 110, it is suddenly released to move upwardly. The energy which has been stored in gas reservoir 42*d* is now free to explosively drive pump piston 28*d* upwardly until cam follower 104 is again positioned adjacent the beginning of spiral rise 108.

The stem 112 is provided with an outwardly extending stop 116 that can impact against a horizontal lip 118 on pump body 20*d* to form a mechanical stop that defines the uppermost position of pump piston 28*d*. In addition, the outlet 54*d* of pump chamber 30*d* can be spaced slightly below the end of bore 101 so that not all the water is exhausted from pump chamber 30*d* during the pumping stroke, thereby leaving a small amount of water in pump chamber 30*d* similar to that described for the other embodiments. While a mechanical stop is shown for piston 28*d*, this stop could be deleted and reliance could be had purely on the water left in pump chamber 30*d* to stop the upward movement of pump piston 28*d*. Preferably, either the mechanical stop 116 or the remaining water in pump chamber 30*d* serve to stop the upward movement of pump piston 28*d* at about the same time, or slightly before, cam follower 104 would reengage against spiral rise 108. Thus, cam follower 104 is desirably positioned very close to spiral rise 108 when the upward movement of pump piston 28*d* is stopped so that continued rotation of cam 103 will shortly cause spiral rise 108 to reengage cam follower 104 and begin a new pump cycle.

Pump apparatus 2*d* has some of the same attributes as the earlier embodiments 2*a*–2*c*. Namely, it provides a pump piston 28*d* that is reciprocated in a pump chamber 30*d* by a generally constant speed, mechanical drive means, e.g. the cam 103. The pump piston 28*d* is configured to be driven at a first speed as the drive means moves it in the direction in which the pump chamber volume is expanded and the pump chamber is filled with water. This movement of the pump piston 28*d* serves to increase the energy stored in the gas reservoir 42*d*. However, the pump piston 28*d* can then be temporarily uncoupled from the drive means when the cam follower 104 reaches the ramp 110 to allow the energy stored in the gas reservoir to quickly accelerate the pump piston to a second substantially faster speed to contract the pump chamber volume and pump the liquid out of the pump chamber at an increased pressure. This will achieve a pressure curve that is closer to the desired pattern of FIG. 14 than it is to the purely sinusoidal pattern shown in the pressure curve of FIG. 13.

While pump apparatus 2*d* has some of the characteristics and advantages of the other pump embodiments, the pump piston 28*d* will have a mass which is generally greater than the mass of the pump pistons in the other embodiments. This is due to the need to equip the pump piston with the outwardly extending stem 112 and cam follower 104 needed to bear against rotary cam 103. Thus, pump piston 28*d* will probably not be accelerated to as fast a second speed as the pump pistons in the other embodiments, and will consequently not produce as square a pressure pattern as the other embodiments. Nonetheless, pump apparatus 2*d* will have a pressure pattern which is squarer than the typical sinusoidal pattern of a prior art reciprocal piston pump.

Referring now to FIG. 12, a further embodiment is shown illustrating a plurality of compression springs 140 arranged beneath pump piston 28*d*. Springs 140 form an energy storing means which can be used in place of gas reservoir 42*d*. Such an alternative has been previously described in this Detailed Description.

Various modifications of this invention will be apparent to those skilled in the art. Accordingly, the scope of this invention is to be limited only by the appended claims.

I claim:

1. A liquid pump apparatus for pumping a liquid at an increased pressure, wherein the apparatus is driven by a motive means that provides a source of power for the liquid pumping action, which comprises:

(a) a pump body having a pump chamber which is suited to be filled with the liquid that is to be pumped, the pump chamber having inlet means for admitting the liquid to the pump chamber and outlet means for allowing the liquid to exit from the pump chamber;

(b) a movable pump means operatively connected to the pump chamber for expanding and contracting the volume of the pump chamber as the pump means is moved;

(c) valve means associated with the inlet means and the outlet means for allowing the liquid to flow into the pump chamber through the inlet means when the pump means is moved in a direction in which the pump chamber is expanded and for allowing the liquid to be pumped out of the pump chamber through the outlet means when the pump means is moved in a direction in which the pump chamber is contracted;

(d) a drive means operatively connected to the motive means for operation over a plurality of pump cycles with each pump cycle comprising a single filling of the pump chamber with liquid and a subsequent expelling of the liquid from the pump chamber, wherein the drive means is separate from the pump means such that the pump means can move independently from the drive means over at least a portion of the movement of the pump means;

(e) means for operatively transmitting the movement of the drive means to the pump means during a portion of each pump cycle such that the transmitted motion moves the pump means at a first speed in the direction in which the pump chamber volume is expanded to fill the pump chamber with liquid; and (f) means for uncoupling the motion transmitting means between the pump means and the drive means after the pump chamber volume has been expanded and filled with liquid and for then accelerating the pump means to a second speed which is faster than the first speed in a direction in which the pump chamber volume is contracted to pump the liquid out of the pump chamber at the increased pressure, wherein the uncoupling and accelerating means comprises:

(i) means operatively connected to the pump means for storing energy and for supplying such energy against the pump means at a location which is suitable to drive the pump means in the direction in which the pump chamber volume is contracted; and (ii) valve means, carried on the drive means, for periodically allowing at least some of the energy stored in the energy storing means to be applied to the pump means.

2. A liquid pump apparatus for pumping a liquid at an increased pressure, wherein the apparatus is driven by a motive means that provides a source of power for the liquid pumping action, which comprises:

(a) a pump body having a pump chamber which is suited to be filled with the liquid that is to be pumped, the pump chamber having inlet means for admitting the liquid to the pump chamber and outlet means for allowing the liquid to exit from the pump chamber;

(b) a movable pump means operatively connected to the pump chamber for expanding and contracting the volume of the pump chamber as the pump means is moved, wherein the pump means comprises a pump piston which is reciprocally contained in an elongated pump bore in the pump body;

(c) valve means associated with the inlet means and the outlet means for allowing the liquid to flow into the pump chamber through the inlet means when the pump means is moved in a direction in which the pump chamber is expanded and for allowing the liquid to be pumped out of the pump chamber through the outlet means when the pump means is moved in a direction in which the pump chamber is contracted;

(d) a drive means operatively connected to the motive means for operation over a plurality of pump cycles with each pump cycle comprising a single filling of the pump chamber with liquid and a subsequent expelling of the liquid from the pump chamber, wherein the drive means is separate from the pump means such that the pump means can move independently from the drive means over at least a portion of the movement of the pump means, wherein the drive means comprises a drive piston that is reciprocally contained in an elongated drive bore in the pump body, and wherein the pump bore and the drive bore are separate from one another such that the pump piston and the drive piston reciprocate along different axes;

(e) means for operatively transmitting the movement of the drive means to the pump means during a portion of each pump cycle such that the transmitted motion moves the pump means at a first speed in the direction in which the pump chamber volume is expanded to fill the pump chamber with liquid; and (f) means for uncoupling the motion transmitting means between the pump means and the drive means after the pump chamber volume has been expanded and filled with liquid and for then accelerating the pump means to a second speed which is faster than the first speed in a direction in which the pump chamber volume is contracted to pump the liquid out of the pump chamber at the increased pressure.

3. A liquid pump apparatus for pumping a liquid at an increased pressure, wherein the apparatus is driven by a motive means that provides a source of power for the liquid pumping action, which comprises:

(a) a pump body having a pump chamber which is suited to be filled with the liquid that is to be pumped, the pump chamber having inlet means for admitting the liquid to the pump chamber and outlet means for allowing the liquid to exit from the pump chamber;

(b) a movable pump means operatively connected to the pump chamber for expanding and contracting the volume of the pump chamber as the pump means is moved;

(c) valve means associated with the inlet means and the outlet means for allowing the liquid to flow into the pump chamber through the inlet means when the pump means is moved in a direction in which the pump chamber is expanded and for allowing the liquid to be pumped out of the pump chamber through the outlet means when the pump means is moved in a direction in which the pump chamber is contracted;

(d) a drive means operatively connected to the motive means for operation over a plurality of pump cycles with each pump cycle comprising a single filling of the pump chamber with liquid and a subsequent expelling of the liquid from the pump chamber, wherein the drive means is separate from the pump means such that the pump means can move independently from the drive means over at least a portion of the movement of the pump means;

(e) means for operatively transmitting the movement of the drive means to the pump means during a portion of each pump cycle such that the transmitted motion moves the pump means at a first speed in the direction in which the pump chamber volume is expanded to fill the pump chamber with liquid; and (f) means for uncoupling the motion transmitting means between the pump means and the drive means after the pump chamber volume has been expanded and filled with liquid and for then accelerating the pump means to a second speed which is faster than the first speed in a direction in which the pump chamber volume is contracted to pump the liquid out of the pump chamber at the increased pressure, wherein the uncoupling and accelerating means comprises:

(i) means operatively connected to the pump means for storing energy and for supplying such energy against the pump means at a location which is suitable to drive the pump means in the direction in which the pump chamber volume is contracted, wherein the energy storing means comprises a closed gas reservoir filled with a gas; and (ii) control means for periodically allowing at least some of the energy stored in the energy storing means to be applied to the pump means.

4. The liquid pump apparatus of claim 3, wherein a portion of the pump means is operatively connected to the gas reservoir to compress the gas within the reservoir as the pump means moves in its volume expanding direction, whereby the compression of the gas increases the energy stored in the gas reservoir as the pump means fills the pump chamber with the liquid so that such stored energy is thereafter available to act against the pump means and drive the pump means in its volume contracting direction.

5. The liquid pump apparatus of claim 4, wherein the pump means comprises a pump piston that is reciprocally contained in an elongated pump bore in the pump body, wherein the pump bore has opposed first and second ends and the pump piston has opposed first and second faces, wherein the pump chamber comprises that portion of the pump bore which is formed between a first end of the pump bore and a first face of the pump piston, and wherein the gas reservoir is operatively connected to that portion of the pump bore which is formed between the opposed second end of the pump bore and the opposed second face of the pump piston.

6. A liquid pump apparatus for pumping a liquid at an increased pressure, wherein the apparatus is driven by a motive means that provides a source of power for the liquid pumping action, which comprises:

(a) a pump body having a pump chamber which is suited to be filled with the liquid that is to be pumped, the pump chamber having inlet means for admitting the liquid to the pump chamber and outlet means for allowing the liquid to exit from the pump chamber;

(b) a movable pump means operatively connected to the pump chamber for expanding and contracting the volume of the pump chamber as the pump means is moved, wherein the pump means comprises a reciprocal pump piston;

(c) valve means associated with the inlet means and the outlet means for allowing the liquid to flow into the pump chamber through the inlet means when the pump means is moved in a direction in which the pump chamber is expanded and for allowing the liquid to be pumped out of the pump chamber through the outlet means when the pump means is moved in a direction in which the pump chamber is contracted;

(d) a drive means operatively connected to the motive means for operation over a plurality of pump cycles with each pump cycle comprising a single filling of the pump chamber with liquid and a subsequent expelling of the liquid from the pump chamber, wherein the drive means is separate from the pump means such that the pump means can move independently from the drive means over at least a portion of the movement of the pump means, wherein the drive means comprises a reciprocal drive piston which is coaxial with the pump piston;

(e) means for operatively transmitting the movement of the drive means to the pump means during a portion of each pump cycle such that the transmitted motion moves the pump means at a first speed in the direction in which the pump chamber volume is expanded to fill the pump chamber with liquid, wherein the motion transmitting means comprises a seal formed of a relatively incompressible fluid trapped between the drive piston and the pump piston such that movement of the drive piston pulls the pump piston with it to operatively couple the pump piston to the drive piston; and (f) means for uncoupling the motion transmitting means between the pump means and the drive means after the pump chamber volume has been expanded and filled with liquid and for then accelerating the pump means to a second speed which is faster than the first speed in a direction in which the pump chamber volume is contracted to pump the liquid out of the pump chamber at the increased pressure.

7. The liquid pump apparatus of claim 6, wherein the accelerating means comprises means operatively connected to the pump piston for storing energy and for supplying such energy against the pump piston at a location which is suitable to drive the pump piston in the direction in which the pump chamber volume is contracted, and further including control means for periodically allowing at least some of the energy stored in the energy storing means to be applied to the pump piston after the pump chamber volume has been expanded and filled with liquid.

8. The liquid pump apparatus of claim 7, wherein the control means includes valve means for breaking the fluid seal between the drive piston and the pump piston at some point in the movement of the drive piston to free the pump piston and allow the energy stored in the energy storing means to accelerate the pump piston away from the drive piston in its volume contracting direction.

9. The liquid pump apparatus of claim 8, wherein the pump piston is reciprocally contained in an elongated pump bore in the pump body, wherein the pump bore and the drive bore comprise a single, common drive/pump bore in the pump body such that the pump piston and the drive piston reciprocate along the same axis, wherein the valve means includes a fluid bleed passage formed on the drive piston and operatively communicating with the fluid trapped between the pump piston and the drive piston, wherein the fluid bleed passage is normally sealed against an inner diameter of the drive/pump bore, and further including a valve portion of greater diameter located at a predetermined location along the drive/pump bore which valve portion registers with the fluid bleed passage at a particular spot in the movement of the drive piston to allow additional fluid contained in the drive/pump bore to enter into the volume between the pump piston and the drive piston, thus breaking the fluid seal between the pump piston and the drive piston.

10. The liquid pump apparatus of claim 8, wherein the relatively incompressible fluid comprises oil.

11. The liquid pump apparatus of claim 8, further including means for reestablishing the fluid seal between the drive piston and the pump piston to reattach the pump piston to the drive piston for movement therewith in the next pump cycle.

12. The liquid pump apparatus of claim 11, wherein the pump piston includes a stem which is telescopically received in a fluid filled socket located in a lower end of the drive piston at the conclusion of the downstroke of the drive piston, and wherein the fluid seal reestablishing means comprises a pressure relief passage and fluid check valve means for opening and letting sufficient fluid to escape from between the pump piston and the drive piston as the drive piston approaches the pump piston to allow the stem to be received in the socket, wherein the check valve is configured to close to prevent further fluid escape while there is some fluid trapped between the pump piston and the drive piston to reestablish the fluid seal between the two.

13. A liquid pump apparatus for pumping an incompressible liquid, which comprises:
(a) a reciprocal piston assembly which is operatively connected to a motive means for reciprocating the piston assembly over a plurality of pump cycles with a single pump cycle comprising an upstroke and a downstroke of the piston assembly;
(b) a pump body having a pump chamber in which one end of the piston assembly is received for reciprocal movement towards and away from one end of the pump chamber;
(c) liquid inlet means leading to the pump chamber for allowing liquid to enter and fill the pump chamber as the one end of the piston assembly is moved away from the one end of the pump chamber and liquid outlet means leading from the pump chamber for allowing liquid to exit the pump chamber as the one end of the piston assembly is moved towards the one end of the pump chamber to pump the liquid out of the pump chamber;
(d) wherein the one end of the piston assembly is formed of two parts comprising a drive piston and a coaxial pump piston, wherein the drive piston is connected to the motive means and the pump piston is separate from the drive piston and is not directly coupled to the motive means, wherein the drive piston and the pump piston are spaced apart by a fluid receiving volume;
(e) means for coupling the pump piston to the drive piston during that stroke of the piston assembly in which the one end of the piston assembly is moved away from the one end of the pump chamber to fill the pump chamber with liquid, wherein the coupling means comprises a seal formed by a relatively incompressible fluid trapped in the fluid receiving volume between the pump piston and the drive piston; and
(f) means for releasing the pump piston from the drive piston after the pump chamber has been filled with liquid to allow the pump piston to be accelerated away from the drive piston back towards the one end of the pump chamber to pump the liquid contained in the pump chamber out of the pump chamber, whereby only the mass of the pump piston has to be accelerated to pump the liquid out of the pump chamber.

14. The liquid pump apparatus of claim 13, wherein the motive means comprises a rotary crankshaft such that the rotary motion of the crankshaft is converted to a reciprocal action of the piston assembly, wherein one revolution of the crankshaft is converted to a single pump single comprising an upstroke and a downstroke of the piston assembly.

15. The liquid pump apparatus of claim 13, wherein the drive piston has a first end and the pump piston has opposed first and second faces, wherein the pump piston second face acts on the liquid in the pump chamber to pump the liquid out of the pump chamber as the pump piston is accelerated towards the one end of the pump chamber, wherein the first face of the pump piston is generally adjacent the first end of the drive piston but is spaced therefrom by the fluid receiving volume, and wherein the coupling means comprises a seal formed by oil trapped in the fluid receiving volume between the first face of the pump piston and the first end of the drive piston such that the fluid receiving volume comprises an oil receiving volume.

16. The liquid pump apparatus of claim 15, wherein the drive piston has oil flow bleed means connecting the oil receiving volume between the drive piston and the pump piston to a supply of oil contained in the pump body around the drive piston, wherein the oil flow bleed means is normally closed to keep the oil seal intact between the pump piston and the drive piston during movement of the pump piston in its volume expanding direction, and further including valve means for opening the oil flow bleed means at the appropriate moment to allow oil to bleed into the oil receiving volume between the pump piston and drive piston to break the oil seal and release the pump piston from the drive piston.

17. The liquid pump apparatus of claim 16, wherein the valve means is carried on the drive piston and is contained in the oil containing area of the pump body.

18. The liquid pump apparatus of claim 16, further including a gas reservoir containing a gas operatively connected to the oil containing area of the pump body, wherein such gas within the reservoir is compressed during the motion of the piston assembly in that stroke which fills the pump chamber with the liquid with such compression serving to increase the energy stored in the gas, and further including passage means for allowing the stored energy in the gas to be applied to the pump piston after the oil seal is broken to accelerate the pump piston at a rate sufficiently fast to pump the liquid out of the pump chamber at an increased pressure.

19. A liquid pump apparatus for pumping an incompressible liquid, which comprises:
(a) a reciprocal piston assembly which is operatively connected to motive means for reciprocating the piston assembly, wherein the piston assembly includes a drive piston and a pump piston with the drive piston being connected to the motive means and the pump piston being separate from the drive piston such that it is not directly coupled to the motive means, and wherein a fluid receiving volume is located between the pump piston and the drive piston;
(b) a pump body in which the piston assembly is received, the pump body having a pump chamber into which the liquid is first drawn and from which the liquid is then pumped as the piston assembly reciprocates back and forth in the pump body in first and second directions;
(c) means for coupling the pump piston to the drive piston when the piston assembly is moved in the first direction to fill the pump chamber with liquid, wherein the coupling means comprises a seal formed by a relatively incompressible fluid trapped in the fluid receiving volume between the pump piston and the drive piston; and (d) means for releasing the pump piston from the drive piston after the pump chamber has been filled with the liquid to allow the pump piston to move in the second direction independently from the drive piston to pump the liquid contained in the pump chamber out of the pump chamber.

20. The liquid pump apparatus of claim 19, wherein the relatively incompressible fluid comprises oil such that the fluid receiving volume comprises an oil receiving volume.

21. The liquid pump apparatus of claim 19, wherein the pump piston and drive piston are coaxially arranged relative to one another in the pump body.

22. The liquid pump apparatus of claim 19, wherein the releasing means comprises valve means for breaking the seal formed by the relatively incompressible fluid contained in the fluid receiving volume.

23. The liquid pump apparatus of claim 23, wherein the valve means comprises:
   means for bleeding fluid between the fluid receiving volume and a supply of the fluid contained in the pump body; and
   a valve portion for opening the bleeding means at the appropriate moment during movement of the piston assembly in the first direction thereof to allow a fluid bleed between the fluid supply and the fluid receiving volume to break the seal and release the pump piston from the drive piston.

24. The liquid pump apparatus of claim 23, wherein the valve portion is located in a bore in the pump body in which bore the drive piston is reciprocally contained.

25. A liquid pump apparatus for pumping a liquid at an increased pressure, wherein the apparatus is driven by a motive means that provides a source of power for the liquid pumping action, which comprises:
   (a) a pump body having a pump chamber which is suited to be filled with the liquid that is to be pumped, the pump chamber having inlet means for admitting the liquid to the pump chamber and outlet means for allowing the liquid to exit from the pump chamber;
   (b) a movable pump means operatively connected to the pump chamber for expanding and contracting the volume of the pump chamber as the pump means is moved;
   (c) valve means associated with the inlet means and the outlet means for allowing the liquid to flow into the pump chamber through the inlet means when the pump means is moved in a direction in which the pump chamber is expanded and for allowing the liquid to be pumped out of the pump chamber through the outlet means when the pump means is moved in a direction in which the pump chamber is contracted;
   (d) a drive means operatively connected to the motive means for operation over a plurality of pump cycles with each pump cycle comprising a single filling of the pump chamber with liquid and a subsequent expelling of the liquid from the pump chamber, wherein the drive means is separate from the pump means such that the pump means can move independently from the drive means over at least a portion of the movement of the pump means;
   (e) means for operatively transmitting the movement of the drive means to the pump means during a portion of each pump cycle such that the transmitted motion moves the pump means at a first speed in the direction in which the pump chamber volume is expanded to fill the pump chamber with liquid; and
   (f) means for uncoupling the motion transmitting means between the pump means and the drive means after the pump chamber volume has been expanded and filled with liquid and for then accelerating the pump means to a second speed which is faster than the first speed in a direction in which the pump chamber volume is contracted to pump the liquid out of the pump chamber at the increased pressure.

26. The liquid pump apparatus of claim 25, wherein the uncoupling and accelerating means comprises:
   (a) means operatively connected to the pump means for storing energy and for supplying such energy against the pump means at a location which is suitable to drive the pump means in the direction in which the pump chamber volume is contracted; and
   (b) control means for periodically allowing at least some of the energy stored in the energy storing means to be applied to the pump means.

27. The liquid pump apparatus of claim 26, further including means for periodically replenishing the energy stored in the energy storing means during the reciprocal motion of the pump means.

28. The liquid pump apparatus of claim 25, wherein the pump means comprises a pump piston which is reciprocally contained in an elongated pump bore in the pump body, and wherein the drive means comprises a drive piston that is reciprocally contained in an elongated drive bore in the pump body.

29. The liquid pump apparatus of claim 28, wherein the motive means includes a rotary crankshaft to which the drive piston is attached by a crankarm such that rotary motion of the crankshaft is converted into reciprocal motion of the drive piston.

30. The liquid pump apparatus of claim 28, wherein the pump bore and the drive bore comprise a single, common drive/pump bore in the pump body such that the pump piston and the drive piston reciprocate along the same axis.

31. A method of turf cultivation, which comprises:
   (a) providing an implement which can travel over a turf area;
   (b) providing on the implement a plurality of nozzle jets pointed downwardly towards the turf;
   (c) providing on the implement a liquid pumping apparatus of the type comprising a pump piston reciprocally received in a bore for movement back and forth in the bore between the ends thereof, wherein a pump chamber comprises the volume of the bore located between the pump piston and the first end of the bore, and wherein the pump chamber is provided with liquid inlet means for admitting liquid into the pump chamber when the pump piston is moved away from the first end of the bore to expand the volume of the pump chamber and to fill it with a charge of the liquid, and the pump chamber is further provided with liquid outlet means for allowing liquid contained in the pump chamber to be expelled from the pump chamber when the pump piston is moved back towards the first end of the bore to contract the volume of the pump chamber and thereby force the liquid out of the pump chamber;

(d) connecting the liquid outlet means of the pumping apparatus to the nozzle jets so that the nozzle jets are supplied with liquid from the pumping apparatus;

(e) reciprocating the pump piston back and forth in the pump over a plurality of pump cycles, wherein the reciprocating step for a single pump cycle comprises:

(i) moving the pump piston at a first speed when the pump piston is moved away from the first end of the bore in its volume expanding direction; and (ii) moving the pump piston at a second speed which is substantially greater than the first speed when the pump piston is moved back towards the first end of the bore in its volume contracting direction, wherein the second speed is sufficiently high such that the liquid is pumped at sufficient pressure to allow the nozzle jets to form the liquid into liquid jets which can penetrate the surface of the turf and create holes in the turf extending below the surface of the turf to thereby condition the turf; and (f) moving the implement over the ground while the pump piston is reciprocated over a plurality of pump cycles to cause an array of spaced holes to be created in the turf by the nozzle jets.

32. A method of pumping a liquid out of a pump chamber in a pump body, wherein the pump body includes a movable pump means the motion of which cyclically expands and contracts a fluid receiving volume of the pump chamber to first fill the pump chamber with liquid and then expel the liquid from the pump chamber at an increased pressure, which comprises:

(a) providing a drive means that furnishes power for the pump means;

(b) operating the drive means such that the pump means is cyclically operated over a plurality of pump cycles with each pump cycle comprising a single filling of the pump chamber with liquid and a subsequent expelling of the liquid from the pump chamber;

(c) providing a pump means which is separate from the drive means to be capable of motion independent of the drive means;

(d) operatively coupling the pump means to the drive means over a first portion of the pump cycle such that the motion of the drive means is transmitted to the pump means during said pump cycle portion for causing the pump means to move at a first speed in its volume expanding direction in the pump chamber to fill the pump chamber with the liquid to be pumped;

(e) uncoupling the pump means from the drive means over a later portion of the pump cycle occurring after the pump means has been moved by the drive means in its volume expanding direction and the pump chamber has filled with liquid; and (f) accelerating the pump means in its volume contracting direction independently of the drive means to a second speed faster than that of the first speed to allow the pump means to quickly contract the volume of the pump chamber and pump the liquid therein out an increased pressure.

33. A method as recited in claim 32, wherein the accelerating step comprises:

(a) providing an energy storing means;

(b) using the movement of the pump means in its volume expanding direction when filling the pump chamber with liquid to increase the energy stored in the energy storing means; and (c) directing the energy stored in the energy storing means against the pump means such that the stored energy biases the pump means in its volume contracting direction to pump the liquid out of the pump chamber, whereby at least some of the energy stored in the energy storing means is used to accelerate the pump means in its volume contracting direction when the pump means is uncoupled from the drive means.

34. A method as recited in claim 32, further comprising reciprocating the pump means relative to the pump body which reciprocating motion comprises the cyclic motion of the pump means.

35. A method of pumping a liquid out of a pump chamber in a pump body, wherein the pump body includes an elongated bore having opposed first and second ends and a pump piston reciprocally received in the bore for movement back and forth in the bore between the ends thereof, wherein the pump chamber comprises the volume of the bore located between the pump piston and the first end of the bore, and wherein the pump chamber is provided with liquid inlet means for admitting liquid into the pump chamber when the pump piston is moved away from the first end of the bore to expand the volume of the pump chamber and to fill it with a charge of the liquid, and the pump chamber is further provided with liquid outlet means for allowing liquid contained in the pump chamber to be expelled from the pump chamber when the pump piston is moved back towards the first end of the bore to contract the volume of the pump chamber and thereby force the liquid out of the pump chamber, which comprises:

(a) moving the pump piston at a first speed when the pump piston is moved away from the first end of the bore in its volume expanding direction; and (b) moving the pump piston at a second speed which is substantially greater than the first speed when the pump piston is moved back towards the first end of the bore in its volume contracting direction.

36. A method as recited in claim 35, wherein the second speed is in the range of from approximately 8 to 40 times faster than the first speed.

37. A method as recited in claim 35, further including the steps of:

(a) providing an energy storing means;

(b) using the movement of the pump piston in its volume expanding direction to increase the energy stored in the energy storing means; and (c) using the energy stored in the energy storing means to accelerate the pump piston to its second speed when the pump piston moves in its volume contracting direction.

* * * * *